(12) United States Patent
Juels et al.

(10) Patent No.: US 9,471,777 B1
(45) Date of Patent: Oct. 18, 2016

(54) SCHEDULING OF DEFENSIVE SECURITY ACTIONS IN INFORMATION PROCESSING SYSTEMS

(75) Inventors: Ari Juels, Brookline, MA (US); Marten Erik van Dijk, Somerville, MA (US); Alina M. Oprea, Arlington, MA (US); Ronald L. Rivest, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 875 days.

(21) Appl. No.: 13/404,839

(22) Filed: Feb. 24, 2012

(51) Int. Cl.
*H04L 29/06* (2006.01)
*G06F 21/55* (2013.01)

(52) U.S. Cl.
CPC .................................... *G06F 21/55* (2013.01)

(58) Field of Classification Search
USPC .......................................................... 726/22
See application file for complete search history.

(56) References Cited

U.S. PATENT DOCUMENTS

| 7,725,937 | B1 * | 5/2010 | Levy .............................. 726/23 |
| 2003/0217292 | A1 * | 11/2003 | Steiger et al. ................. 713/201 |
| 2004/0220790 | A1 * | 11/2004 | Cullick et al. .................. 703/10 |
| 2007/0226796 | A1 * | 9/2007 | Gilbert et al. .................. 726/22 |
| 2008/0120561 | A1 * | 5/2008 | Woods .......................... 715/764 |
| 2012/0185913 | A1 * | 7/2012 | Martinez et al. ................. 726/1 |

OTHER PUBLICATIONS

A. Shulman, "The Underground Credentials Market," Computer Fraud & Security, Mar. 2010, 4 Pages, vol. 2010, Issue 3.

R.J. Witty et al., "Justify Identity management Investment with Metrics," Gartner Group Report, Feb. 2004, 6 pages.
G. Ateniese et al., "Provable Data Possession at Untrusted Stores," ACM Conference on Computer and Communications Security (CCS), Oct.-Nov. 2007, pp. 598-609.
K.D. Bowers et al., "Hail: A High-Availability and Integrity Layer for Cloud Storage," ACM Conference on Computer and Communications Security (CCS), Nov. 2009, pp. 187-198.
K.D. Bowers et al., "How to Tell if Your Cloud Files are Vulnerable to Drive Crashes," RSA Laboratories, Cryptology ePrint Archive, Report 2010/214, 2010, 18 pages.
Y. Dodis et al., "Key-Insulated Public-Key Cryptosystems," Cryptology ePrint Archive, Report 2002/077, 2002, 19 pages.
N. Falliere et al., "W32.Stuxnet Dossier," Version 1.4, Symantec Security Response, Feb. 2011, 69 pages.
D. Fudenberg et al., "Game Theory," The MIT Press, Aug. 1991, 579 pages.

(Continued)

*Primary Examiner* — Jason K Gee
(74) *Attorney, Agent, or Firm* — Ryan, Mason & Lewis, LLP

(57) ABSTRACT

A processing device is configured to identify a plurality of defensive security actions to be taken to address a persistent security threat to a system comprising information technology infrastructure, and to determine a schedule for performance of the defensive security actions based at least in part on a selected distribution derived from a game-theoretic model, such as a delayed exponential distribution or other type of modified exponential distribution. The system subject to the persistent security threat is configured to perform the defensive security actions in accordance with the schedule in order to deter the persistent security threat. The distribution may be selected so as to optimize defender benefit in the context of the game-theoretic model, where the game-theoretic model may comprise a stealthy takeover game in which attacker and defender entities can take actions at any time but cannot determine current game state without taking an action.

22 Claims, 5 Drawing Sheets

(56) References Cited

OTHER PUBLICATIONS

Steven Gregory, "Homeland Security Presidential Directive-12," ISSA Journal, Nov. 2007, pp. 14-20.
S.N. Hamilton et al., "Challenges in Applying Game Theory to the Domain of Information Warfare," Information Survivability Workshop (ISW), 2002, 4 pages.
Gene Itkis, "Cryptographic Tamper Evidence," ACM Conference on Computer and Communications Security (CCS), Oct. 2003, pp. 355-364.
Gene Itkis, "Forward Security: Adaptive Cryptography: Time Evolution," Handbook of Information Security, 2006, 27 pages.
A. Juels et al., "PORs: Proofs of Retrievability for Large Files," ACM Conference on Computer and Communications Security (CCS), Oct. 2007, pp. 584-597.
Jonathan Katz, "Bridging Game Theory and Cryptography: Recent Results and Future Directions," 5th Conference on Theory of Cryptography, Mar. 2008, pp. 251-272.
P. Mell et al., "The NIST Definition of Cloud Computing," National Institute of Standards and Technology (NIST), Special Publication 800-145, 2011, 7 pages.
T. Moore et al., "Would a 'Cyber Warrior' Protect Us? Exploring Trade-Offs Between Attack and Defense of Information Systems," ACM New Security Paradigms Workshop (NSPW), Sep. 2010, pp. 85-94.
K.C. Nguyen et al., "Security Games with Incomplete Information," IEEE International Conference on Communications (ICC), Jun. 2009, 6 pages.
J. Pathak et al., "Minimizing Cost of Continuous Audit: Counting and Time Dependent Strategies," Journal of Accounting and Public Policy, 2005, pp. 61-75, vol. 24.
Dusko Pavlovic, "Gaming Security by Obscurity," arXiv:1109,5542v3 [cs.CR], Nov. 2011, 15 pages.
Ronald L. Rivest, "Illegitimi Non Carborundum," Crypto, http://people.csail.mit.edu/rivest/pubs.html#Riv11b, Aug. 2011, 121 pages.
Sheldon M. Ross, "Stochastic Processes," John Wiley & Sons, Inc., Second Edition, 1996, 265 pages.
S. Roy et al., "A Survey of Game Theory as Applied to Network Security," 43rd Hawaii International Conference on System Sciences, (HICSS), Jan. 2010, 10 pages.
H. Shacham et al., "Compact Proofs of Retrievability," Proceedings of Asiacrypt, Lecture Notes in Computer Science (LNCS), 2008, pp. 90-107, vol. 5350.
R.S. Sutton et al., "Reinforcement Learning: An Introduction," MIT Press, 1998, 551 pages.
U.S. Appl. No. 13/171,759, filed in the name of K.D. Bowers et al. on Jun. 29, 2011 and entitled "Graph-Based Approach to Deterring Persistent Security Threats."
U.S. Appl. No. 13/173,877, filed in the name of A. Juels et al. on Jun. 30, 2011 and entitled "Refresh-and-Rotation Process for Minimizing Resource Vulnerability to Persistent Security Threats."
U.S. Appl. No. 12/982,288, filed in the name of J.P. Field et al. on Dec. 30, 2010 and entitled "Distributed Security Information and Event Management System with Application-Injected Remote Components."
D.Y. Chan et al., "Innovation and Practice of Continuous Auditing," International Journal of Accounting Information Systems, 2011, 14 pages.
Symantic Corporation, "Symantec Report on the Underground Economy," Nov. 2008, 84 pages.
Steven Gregory, "Homeland Security Presidential Directive-12," ISSA Journal, The Global Voice of Information Security, Nov. 2007, pp. 14-20.
C. Kanich et al., "Show Me the Money: Characterizing Spam-Advertised Revenue," Usenix Security, 2011, 15 pages.

* cited by examiner

SCHEDULING OF DEFENSIVE SECURITY ACTIONS IN INFORMATION PROCESSING SYSTEMS

FIELD

Illustrative embodiments of the invention relate generally to information processing systems, and more particularly to techniques for protecting such systems from persistent security threats.

BACKGROUND

Information technology infrastructure of a company, organization or other enterprise is continuously subject to a wide variety of security threats. For example, advanced persistent threats (APTs) represent a very sophisticated class of attacks against an enterprise. APTs are usually mounted by well-funded attackers with very specific targets. To accomplish their goals, attackers orchestrating an APT typically introduce periods of delay among different stages of the attack, advance slowly while keeping their footprint low, and control the propagation of the attack through the use of human operators.

An APT is therefore a long-duration and stealthy security threat that characteristically unfolds in a multi-stage process, with a significant interval of time between stages. Other factors that may contribute to the "low-and-slow" execution that is typical of APTs include the use of low-bandwidth covert channels, a human-directed command-and-control center, and orchestration of multiple vectors of compromise, some of which may be physical, human, political or military. A given APT may therefore combine several distinct types of attacks, such as zero-day attacks (e.g., exploitation of unpatched software vulnerabilities) and advanced social engineering attacks.

Conventional defenses against APTs are often deployed in an ad-hoc manner, without a global understanding of attackers' goals and the objectives of the enterprise under attack. Defending against APTs is further complicated by the fact that an increasing number of enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used to build a variety of different types of virtual infrastructure, including cloud computing and storage systems, distributed across hundreds of interconnected physical computers and storage devices. Use of such cloud-based arrangements for at least a portion of the information technology infrastructure of a given enterprise can introduce additional challenges in defending the enterprise against APTs.

Improved techniques for protecting a system comprising information technology infrastructure from an APT or other persistent security threat are disclosed in U.S. patent application Ser. No. 13/171,759, filed Jun. 29, 2011 and entitled "Graph-Based Approach to Deterring Persistent Security Threats," and U.S. patent application Ser. No. 13/173,877, filed Jun. 30, 2011 and entitled "Refresh-and-Rotation Process for Minimizing Resource Vulnerability to Persistent Security Threats," both of which are commonly assigned herewith and incorporated by reference herein.

Notwithstanding the considerable advances provided by the techniques described in the above-cited U.S. patent applications, a need remains for further improvements in protecting information processing systems from persistent security threats, particularly in terms of scheduling of defensive security actions in such systems.

SUMMARY

Illustrative embodiments of the invention provide improved techniques for scheduling of defensive security actions in information processing systems, utilizing a selected distribution derived from a game-theoretic model. For example, the distribution may comprise a delayed exponential distribution or other type of modified exponential distribution. The distribution may be selected so as to optimize defender benefit in the context of a game-theoretic model that characterizes an APT or other persistent security threat and the defensive security actions to be taken in response to that threat.

In one embodiment, a processing device is configured to identify a plurality of defensive security actions to be taken to address a persistent security threat to a system comprising information technology infrastructure, and to determine a schedule for performance of the defensive security actions based at least in part on a selected distribution derived from a game-theoretic model. As noted above, the selected distribution may comprise a modified exponential distribution, wherein the modified exponential distribution comprises a combination of an exponential distribution and at least one other distribution. The system subject to the persistent security threat is configured to perform the defensive security actions in accordance with the schedule in order to deter the persistent security threat.

By way of example, the distribution may be selected so as to optimize defender benefit in the context of the game-theoretic model, where the game-theoretic model in a given embodiment may comprise a stealthy takeover game in which attacker and defender entities can take actions at any time, with the actions having associated costs, but cannot determine current game state without taking an action.

One or more of the illustrative embodiments can be used to determine optimal scheduling of defensive security actions such as key update operations, virtual machine refresh operations, cloud service auditing operations, password reset operations, and many others. The disclosed arrangements provide substantial improvements in defending against APTs and other types of persistent security threats, particularly in large-scale cloud systems that comprise distributed virtual infrastructure.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

1 Example System Configurations

Figure 1:
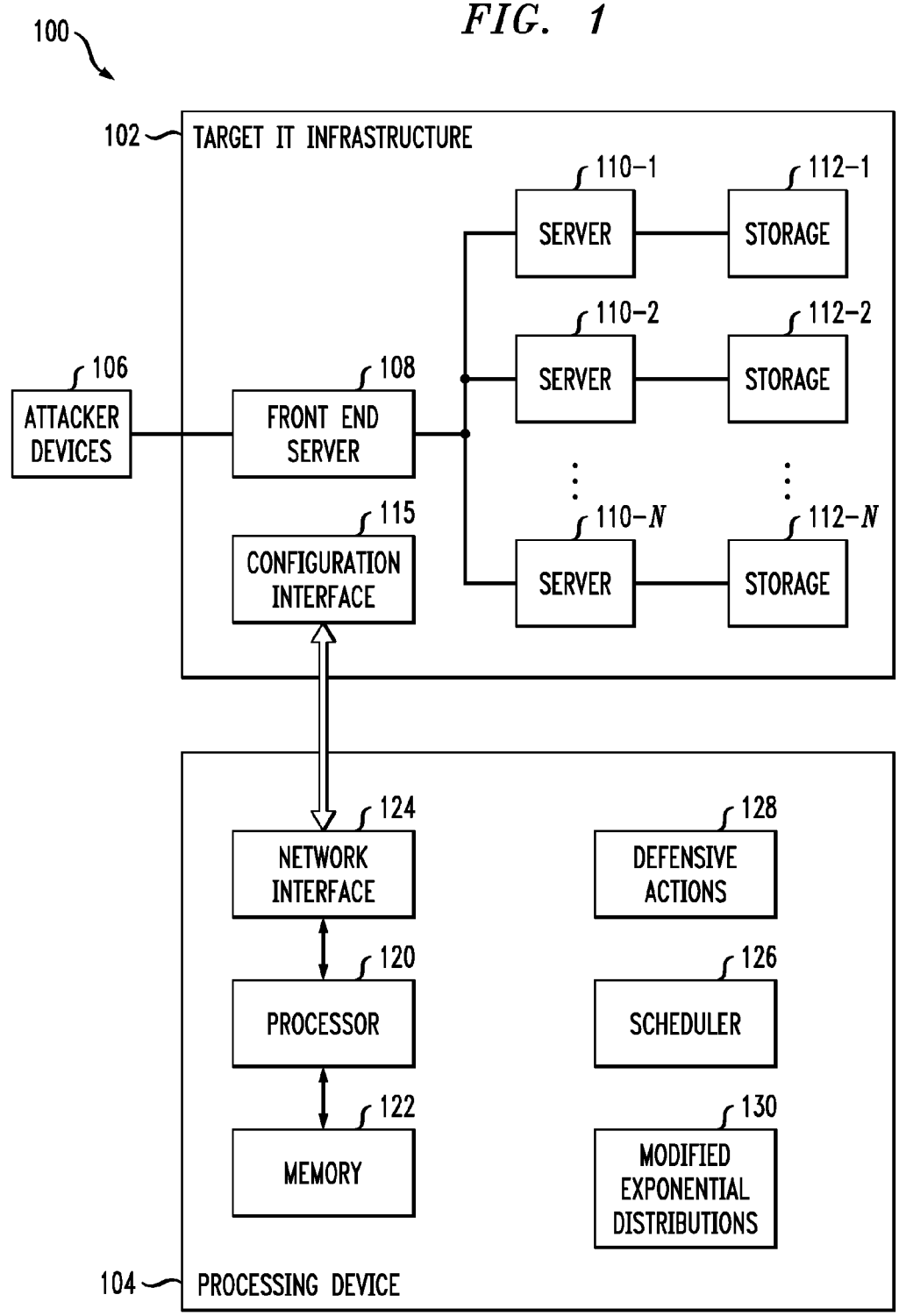
FIG. 1 is a block diagram of an information processing system that incorporates functionality for scheduling defensive security actions using a selected distribution derived from a game-theoretic model in an illustrative embodiment of the invention.

FIG. 1 shows an information processing system 100 configured with functionality for scheduling of defensive security actions using modified exponential distributions in an illustrative embodiment of the invention. The system 100 in this embodiment comprises target information technology (IT) infrastructure 102 that is coupled to an additional processing device 104, which may comprise a separate computer or server. The IT infrastructure 102 of system 100 is the target of an APT or other persistent security threat from an attacker associated with one or more attacker devices 106, which may also comprise computers, servers or other types of processing devices, in any combination. These attacker devices 106 in the present embodiment access the target IT infrastructure 102 via a front end server 108. The target IT infrastructure 102 further comprises a plurality of servers 110-1, 110-2, . . . 110-N coupled to the front end server 108, as well as a plurality of storage devices 112-1, 112-2, . . . 112-N, where N is an arbitrary number. One or more of the servers 108 and 110 may comprise servers running web applications, such as, for example, file transfer protocol (FTP) servers, although a wide variety of other types of servers may be used.

The servers 108 and 110 and the storage devices 112 of IT infrastructure 102 may be viewed as examples of what are more generally referred to herein as "processing devices" and may collectively comprise one or more processing platforms in which processing devices are configured to communicate with one another over a network. Each such device generally comprises at least one processor and an associated memory, and implements one or more functional modules for controlling certain features of the information processing system 100. Multiple system elements may be implemented by a single processing device in a given embodiment.

The various servers and storage devices of the target IT infrastructure 102 may comprise, for example, cloud-based distributed infrastructure used to provide one or more services for an associated enterprise, including, but not limited to, Infrastructure as a Service (IAAS), Platform as a Service (PAAS), and Software as a Service (SAAS). Such a distributed infrastructure may comprise one or more hypervisor platforms each having associated virtual processing and storage elements. A more detailed example of such an arrangement will be described in greater detail below in conjunction with FIG. 3.

The target IT infrastructure 102 may additionally or alternatively comprise a security information and event management (SIEM) system as described in U.S. patent application Ser. No. 12/982,288, filed Dec. 30, 2010 and entitled "Distributed Security Information and Event Management System with Application-Injected Remote Components," which is commonly assigned herewith and incorporated by reference herein. The techniques disclosed therein can be used to enhance the functionality of a centralized SIEM system such as the enVision® platform commercially available from RSA, The Security Division of EMC Corporation.

The processing device 104 communicates with the target IT infrastructure 102 via a configuration interface 115. Although shown in the figure as being separate from the target IT infrastructure 102 of the system 100, in other embodiments the processing device may be implemented within the target IT infrastructure. Thus, the target IT infrastructure may comprise at least a portion of the processing device 104. In other embodiments, system 100 may comprise a computer system that both determines scheduling of defensive security actions and performs those actions. As another example, the system 100 may comprise a first computer system that performs defensive security actions in accordance with a schedule determined by another computer system and stored in the memory of the first computer system. In such embodiments, it is possible that the system may comprise only a single computer, server, mobile telephone or other processing device. The term "information technology infrastructure" as used herein is intended to be broadly construed so as to encompass these and numerous other arrangements of one or more processing devices.

The processing device 104 in the present embodiment comprises a processor 120 coupled to a memory 122. The processor 120 may comprise a microprocessor, a microcontroller, an application-specific integrated circuit (ASIC), a field programmable gate array (FPGA) or other type of processing circuitry, as well as portions or combinations of such circuitry elements. The memory 122 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by processing device 104 causes the device to perform functions associated with scheduling of defensive security actions using modified exponential distributions, in order to deter one or more persistent security threats to the IT infrastructure 102. One skilled in the art would be readily able to implement such software given the teachings provided herein. Other examples of computer program products embodying aspects of the invention may include, for example, optical or magnetic disks.

Also included in the processing device 104 is network interface circuitry 124, which is used to interface the processing device with the target IT infrastructure 102 via configuration interface 115. Such network interface circuitry may comprise conventional transceivers of a type well known in the art.

The processing device 104 further comprises a number of functional modules utilized to deter APTs or other persistent security threats to the IT infrastructure 102, including a scheduler 126 which interacts with both a defensive actions module 128 and a modified exponential distributions module 130. The scheduler 126 utilizes the defensive actions module 128 to identify a plurality of defensive security actions to be taken to address a persistent security threat, and utilizes the modified exponential distributions module 130 to determine an appropriate schedule for performance of the defensive security actions based at least in part on a selected distribution derived from a game-theoretic model.

For example, the selected distribution may comprise a modified exponential distribution formed as a combination of an exponential distribution and at least one other distribution. As a more particular example, in such an arrangement the scheduled intervals for the defensive security actions may follow a delayed exponential distribution, in which a given interval is a constant plus an exponentially distributed random variable. A delayed exponential distribution of this type may be viewed as a combination of an exponential distribution and a periodic distribution.

It is to be appreciated that other types of distributions may be used, such as a gamma distribution. Such a gamma distribution may comprise, for example, a generalized gamma function having a three-parameter distribution. Thus, in other embodiments, module 130 may be configured to implement a variety of other types of distributions derived from one or more game-theoretic models.

As will be described in greater detail below, the distribution selected by the scheduler 126 for scheduling the defensive security actions may be determined based at least in part on assessment of the persistent security threat and the defensive security actions in accordance with a game-theoretic model, and more particularly may be determined so as to optimize defender benefit in the context of the game-theoretic model. In illustrative embodiments of the present invention, the game-theoretic model comprises a stealthy takeover game referred to herein as "FlipIt," in which attacker and defender entities can each take control of a specified resource at any time by taking an action having a particular cost, but cannot determine current game state without taking the action.

In some of the embodiments to be described, the selected distribution is a modified exponential distribution. The modified exponential distribution may comprise a delayed exponential distribution, which may be viewed as a combination of an exponential distribution and a periodic distribution, or may alternatively comprise an exponential distribution combined with at least one other distribution of a different type, such as a gamma distribution, a normal distribution or a uniform distribution. Numerous other types of distributions may be used in other embodiments, as derived from an appropriate game-theoretic model, such as the FlipIt game and variants thereof.

The schedule determined by the scheduler 126 may be utilized to configure the IT infrastructure 102 via its configuration interface 115. For example, information characterizing at least a portion of the schedule may control various adjustable security processes and parameters of the IT infrastructure via the configuration interface 115. This is one way in which the system 100 may be configured to perform the defensive security actions in accordance with the schedule in order to deter the persistent security threat.

The schedule may specify, for example, particular defensive security actions to be performed sequentially by at least one processing device of the system 100, as well as time intervals between those actions. It is to be appreciated, however, that the schedule developed by scheduler 126 need not take any particular form, but may instead comprise any type of information indicating the manner in which defensive security actions are to be performed by one or more processing devices of the system. The scheduled defensive actions may comprise, for example, key update operations, virtual machine refresh operations, cloud service auditing operations, password reset operations, or other types of security-related actions that may be taken in system 100, in any combination. These exemplary defensive actions will each be described in more detail below in the context of the FlipIt game.

It should be noted that this particular set of modules 126, 128 and 130 for implementing the defensive security action scheduling functionality of the system 100 is presented by way of example, and in other embodiments additional or alternative modules may be used. Also, the functionality associated with these particular modules in the FIG. 1 embodiment may be combined into a smaller set of functional modules or separated into a larger set of functional modules in other embodiments. For example, modules 128 and 130 may be incorporated at least in part into scheduler 126 in other embodiments.

Also, one or more of the modules 126, 128 and 130 of the processing device 104 may be implemented at least in part in the form of software that is stored by memory 122 and executed by processor 120. Accordingly, such modules need not be separate from the processor and memory elements as is illustratively shown in FIG. 1.

It should also be understood that a given embodiment of the system 100 may include multiple instances of the elements 102, 104 and 106, although only single instances of such elements are shown in the system diagram for clarity and simplicity of illustration. For example, separate instances of processing device 104 with defensive security action scheduling functionality may be provided for different portions of the IT infrastructure 102, or for each of a plurality of different instances of such IT infrastructure.

In addition, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

It is therefore to be appreciated that the particular arrangement of system elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the IT infrastructure 102 and additional processing device 104 may each run on a separate processing platform, or portions of such elements may run on the same platform.

The operation of the information processing system 100 will now be described in greater detail with reference to the flow diagram of FIG. 2, which illustrates a process for scheduling defensive security actions in the system. The process includes steps 200 through 208 as shown, and these steps in the present embodiment are implemented primarily by the processing device 104, although in other embodiments one or more such steps may be implemented by other system elements, or by the processing device 104 operating in conjunction with another system element, such as a component of the IT infrastructure 102.

Also, this embodiment assumes the use of a modified exponential distribution, such as a delayed exponential distribution, but other embodiments can use other distributions, including, for example, gamma distributions.

In step 200, multiple security actions to be taken to address a persistent security threat are identified. For example, this may involve determining the particular type of security threat and one or more sets of actions that will be utilized to counter that threat, through interaction with module 128. As noted above, the actions may comprise key update operations, virtual machine refresh operations, cloud service auditing operations, password reset operations, or other types of security-related actions that may be taken in system 100, in any combination.

In step 202, the persistent security threat and the associated defensive security actions are characterized using a stealthy takeover game model, such as the FlipIt game described in more detail elsewhere herein.

In step 204, the stealthy takeover game model is utilized to determine a modified exponential distribution that optimizes defender benefit in the system 100. This may involve selection of a particular one of a plurality of modified exponential distributions available within module 130. Again, other distributions derived from game-theoretic models may be used in other embodiments.

In step 206, a schedule is determined by the scheduler 126 for performance of the identified defensive security actions, based at least in part on the modified exponential distribution previously determined in step 204.

In step 208, at least one processing device of the information technology infrastructure 102 is configured to perform the defensive security actions in accordance with the schedule previously determined in step 206.

Figure 2:
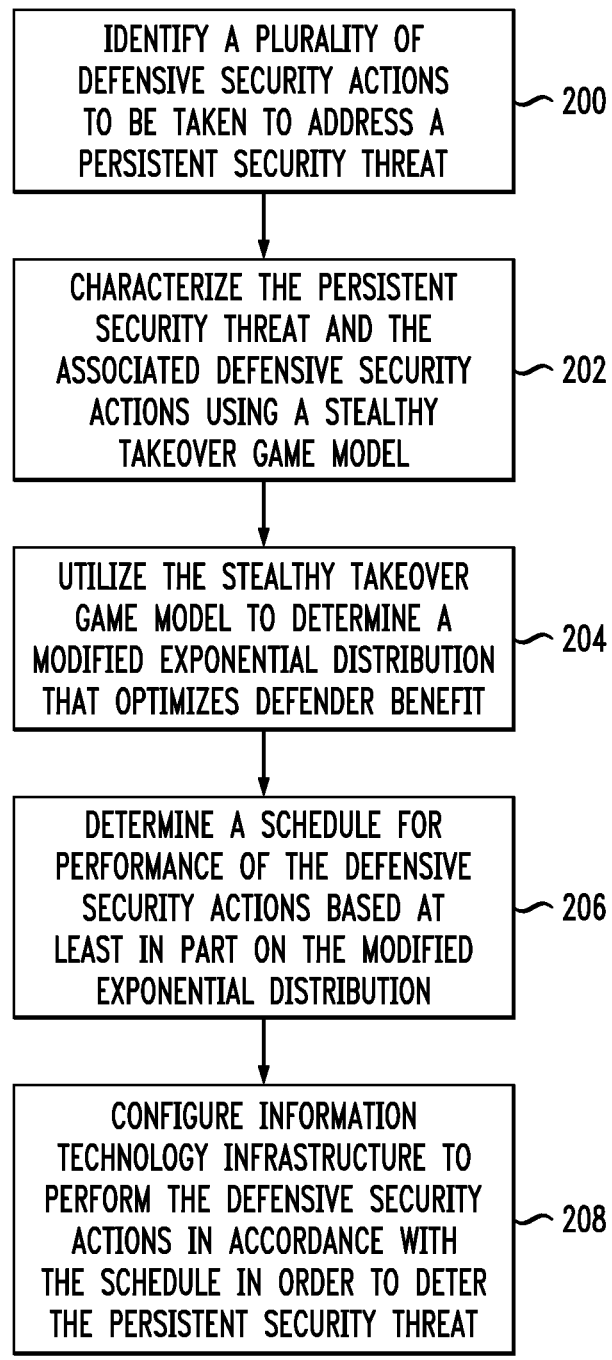
FIG. 2 is a flow diagram of a process for scheduling of defensive security actions in the system of FIG. 1.

Advantageously, the illustrative process of FIG. 2 can be used to provide scheduling of defensive security actions in system 100 in a manner that optimizes defender benefit. The defender in this context may refer to a service provider or other entity that supplies, implements, or maintains at least a portion of the system. As will be described, utilizing modified exponential distributions to schedule defensive security actions considerably facilitates defending against APTs and other types of persistent security threats, particularly in large-scale cloud systems that comprise distributed virtual infrastructure.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementation of defensive security action scheduling to deter persistent security threats. For example, the ordering of the process steps may be varied in other embodiments, or certain steps may be performed concurrently with one another rather than serially. Also, additional or alternative process steps may be used. Thus, in a given embodiment, schedule determination may be performed adaptively, possibly on an action-by-action basis, utilizing feedback associated with one or more previous actions. Accordingly, the term "schedule" as utilized herein is intended to be broadly construed, and may specify timing intervals for performance of a series of actions over time, but with only a single one of the intervals associated with a corresponding one of the actions being specified at any given time. In such an arrangement, steps 204, 206 and 208 may be performed repeatedly for each of a series of actions. Numerous alternative scheduling arrangements are possible in other embodiments.

As indicated previously, functionality such as that described in conjunction with the flow diagram of FIG. 2 can be implemented at least in part in the form of one or more software programs stored in memory and executed by a processor of a processing device such as a computer or server. A memory having such program code embodied therein is an example of what is more generally referred to herein as a "computer program product."

Figure 3:
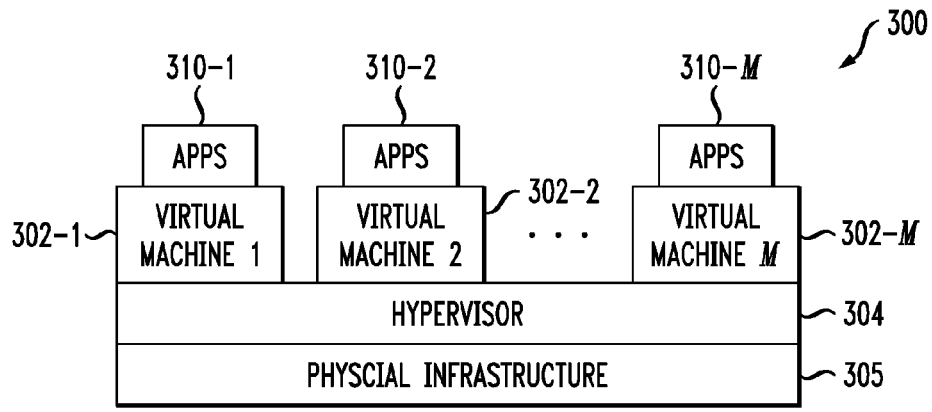
FIG. 3 shows one possible embodiment of cloud infrastructure that may be utilized to implement at least a portion of the FIG. 1 system.

Referring now to FIG. 3, portions of the IT infrastructure 102 of information processing system 100 may comprise cloud infrastructure 300. The cloud infrastructure 300 comprises virtual machines (VMs) 302-1, 302-2, . . . 302-M implemented using a hypervisor 304. The hypervisor 304 is an example of what is more generally referred to herein as "virtualization infrastructure." The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

It is also possible that the cloud infrastructure may encompass other portions of the system 100, such as portions of one or more of the processing device 104 and the attacker device 106.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure 102 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure 102 of system 100.

Figure 4:
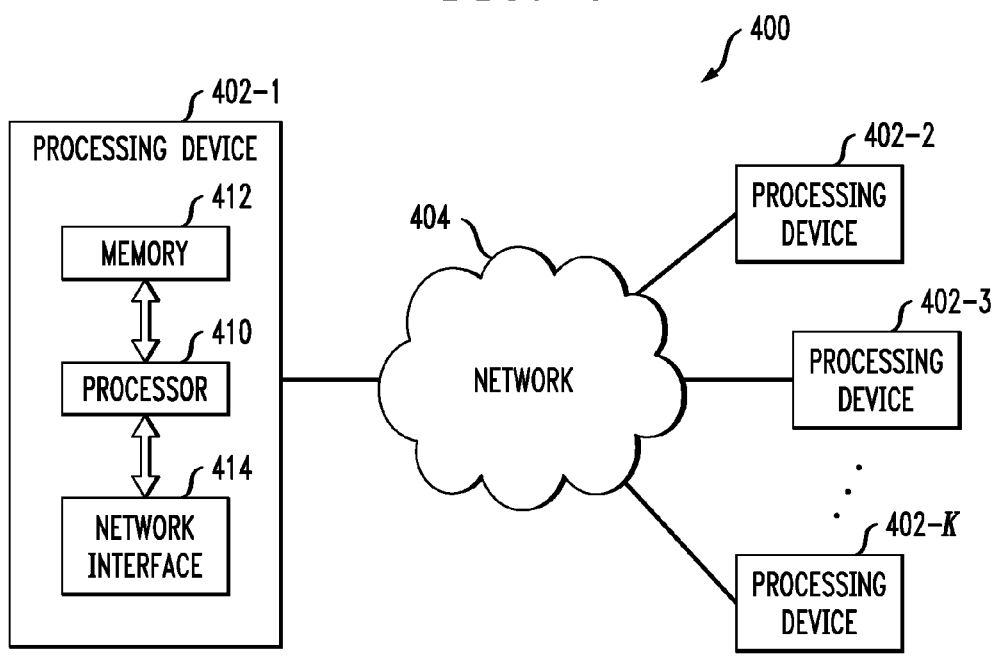
FIG. 4 shows one possible embodiment of a processing platform that may be utilized to implement at least a portion of the FIG. 1 system.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 104 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412, which may be configured in a manner similar to that previously described for processor 120 and memory 122 of FIG. 1. The processor 410 may therefore comprise a microprocessor, a microcontroller, an ASIC, an FPGA or other type of processing circuitry, as well as portions or combinations of such circuitry elements, and the memory 412, which is another example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Illustrative embodiments of the invention will now be described in greater detail with reference to FIGS. 5 through 8, which show examples of the stealthy takeover game referred to herein as FlipIt, and FIGS. 9 and 10, which show plots relating to one or more of these embodiments. It should be noted that the particular stealthy takeover games to be described are presented by way of example only, and other embodiments may determine appropriate scheduling of defensive security actions using distributions based on other game-theoretic models.

2 FlipIt Introduction

FlipIt is a two-player game in which the two players, also referred to as attacker and defender, compete to control a resource. The attacker and defender are assumed to be respective entities implemented in or otherwise associated with the system 100, and may represent, for example, respective human users, or their associated processing devices, or a combination of human user and associated processing device. The resource could be, for example, a secret key, a password or an entire infrastructure, depending on the situation being modeled. Players take control of the resource by moving, and paying a certain move cost, but unlike most existing games, players do not alternate turns and instead can move at any given time. Moreover, players do not immediately know when the other player moves. A given player only finds out about the state of the game when that player moves. This stealthy aspect of the game is a unique feature of FlipIt. The goal of each player is to maximize a metric referred to herein as "benefit" and which may be defined in illustrative embodiments as the fraction of time the player controls the resource minus the average move cost. A good strategy for one player in the game, therefore, is one that gives the player control of the resource a large fraction of the time, and achieves this at minimal cost.

A number of different variants of FlipIt move strategies will be described herein. These include non-adaptive (NA) strategies in which a player does not receive any feedback during the game, and adaptive (AD) strategies in which a player receives certain types of feedback when moving.

In the class of non-adaptive strategies, one subclass of particular interest is that of renewal strategies. For a player employing a renewal strategy, the intervals between the player's consecutive moves are independent and identically distributed random variables generated by a renewal process. Examples of renewal strategies include a periodic strategy in which the interval between two consecutive moves is fixed at a constant value, and an exponential strategy in which the intervals between consecutive moves are exponentially distributed. The moves of a player employing a non-adaptive but possibly randomized strategy can be determined before the game starts, as there is no feedback received during the game.

In the class of adaptive strategies, we distinguish a subclass called last-move (LM) strategies, in which the player finds out upon moving the exact time when its opponent moved last. In a general adaptive strategy, also referred to as a full-history (FH) strategy, a player receives upon moving complete information about its opponent's moves. The LM and FH strategies collapse in some cases, such as plays with a renewal strategy.

A further dimension to a player's strategy is the amount of information the player receives before the game starts. Besides the case in which the player receives no information about its opponent before the game, other interesting cases are: (1) rate-of-play (RP) when the player finds out the exact rate of play of its opponent; (2) knowledge-of-strategy (KS) when the player finds out full information about the strategy of the opponent (but not the randomness used).

In the description to follow, we start by analyzing the simple game in which both players employ a periodic strategy with a random phase (in such a strategy moves are spaced at equal intervals, with the exception of the first randomly selected move called the phase). We compute the Nash equilibrium point for the periodic game and show that the benefit of the player with higher move cost is always 0 in the Nash equilibrium. When move costs of both players are equal, players control the resource evenly and both achieve benefit 0.

We consider next a variant of FlipIt in which both players play with either a renewal or periodic strategy with random phase (we call such games renewal games). It will be shown for the renewal game that the periodic strategy with a random phase dominates all renewal strategies of fixed rate. Therefore, we can completely characterize the residual FlipIt game when players employ either renewal or periodic strategies, where the residual game consists of all remaining strategies after elimination of strongly dominated strategies, which are periodic strategies in this case.

We also analyze the renewal game in which the attacker receives additional information about the defender at the beginning of the game, in particular the rate of play of the defender. For this version of the game, we prove that the periodic strategy with a random phase still dominates. Additionally, we determine parameter choices for the rates of play of both attacker and defender that achieve maximum benefit.

Moving towards increased sophistication in the attacker's strategy, we analyze next several FlipIt instances for the attacker in the broad LM class. The attacker in this case adaptively determines its next move based on the feedback learned during the game, in particular the exact time of the defender's last move. In this setting, periodic play for the defender is not very effective, as the attacker learning the defender's period and last move time can move right after the defender achieving control of the resource most of the time. We demonstrate that by playing with an exponential strategy instead, the defender forces an adaptive attacker into playing periodically (more specifically, the periodic strategy is the dominant attacker strategy in the class of all LM-adaptive strategies). Paradoxically, therefore, the attacker's dominant strategy does not make use of the full knowledge the attacker gains from the feedback received during the game. Additionally, we determine optimal parameters (i.e., parameters that optimize both players' benefits) for both the exponential defender and periodic attacker distributions.

For both non-adaptive and fully adaptive attacker strategies, we show that by playing periodically at sufficiently high rate, the defender can force the attacker to drop out of the game. Nevertheless, the move cost of the defender needs to be significantly lower than that of the attacker for such a strategy to bring benefit to the defender. This demonstrates that the player lowering its move cost relative to its opponent obtains a high advantage in the game and can effectively control the resource at all times.

We propose an enhancement to the exponential distribution employed by the defender, a strategy in which the defender waits after each move for some fixed interval and then chooses a time interval exponentially distributed until the next move. We show experimentally that, with this strategy (called delayed exponential) the benefit of the defender increases compared to an exponential play. This result provides evidence that the exponential strategy is not the dominant renewal defender strategy against an LM attacker.

Lastly, we describe a Greedy algorithm in which the attacker's moves are chosen to maximize the local benefit achieved in an interval between two consecutive attacker moves. We demonstrate that for some renewal strategies previously analyzed (in particular those given by periodic and exponential distributions), the Greedy algorithm finds the dominant LM-adaptive attacker strategy. We also show one example for which the Greedy algorithm does not result in the dominant strategy for the attacker.

The basic FlipIt game will now be described in greater detail. Consider a resource that can be controlled (or "owned") by either of two players (attacker or defender). Ownership will change back and forth following a move of either player, with the goal of each player being to maximize the fraction of time that he or she controls the resource. A distinctive feature of FlipIt is its stealthy aspect, that is, each player does not know when the other player has taken over. Nor do the players know the current ownership of the resource unless they perform a move. Nevertheless, there is a cost players have to pay for each move, which disincentivizes the players from moving too frequently.

In an example implementation of a basic version of FlipIt, each player has a control panel with a single button and a light. The player may push button at any time (in the most general form of FlipIt, we consider time to be continuous, but we support discrete variants as well). Pushing the button always causes the button-pusher to take ownership of the resource. We assume that players don't push their buttons at the same time (or, if they do, then ownership doesn't change hands).

If pushing the button causes ownership to change hands, then the light also flashes when the button is pushed. We call this a "takeover." If the button-pusher already had ownership of the resource, then the light doesn't flash and the button-push was wasted.

The players can't see each other's control panels, and thus the defender doesn't know when the attacker takes control, and vice versa. The only way a player can determine the state of the game is to push its button. Thus a move by either player has two consequences: it changes the control of the resource, but at the same time, it reveals the state of the resource (before the move) to the player taking control.

There is always a cost to pushing the button. In this example, pushing the button costs the equivalent of one second of ownership. Thus, at any time t, each player's net score is the number of seconds he has had ownership of the resource, minus the number of times he has pushed its button.

Figure 5:
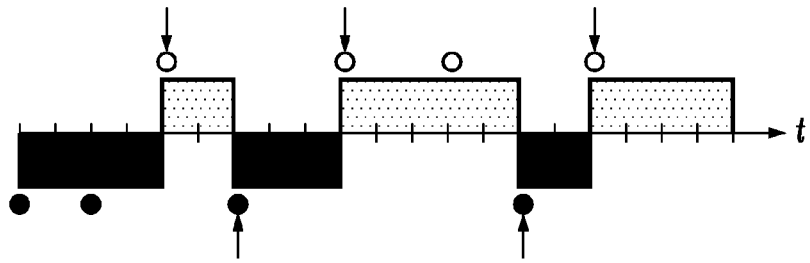
FIGS. 5-8 show attacker and defender moves in exemplary stealthy takeover games that may be utilized to determine distributions that optimize defender benefit in embodiments of the invention.
Figure 6:
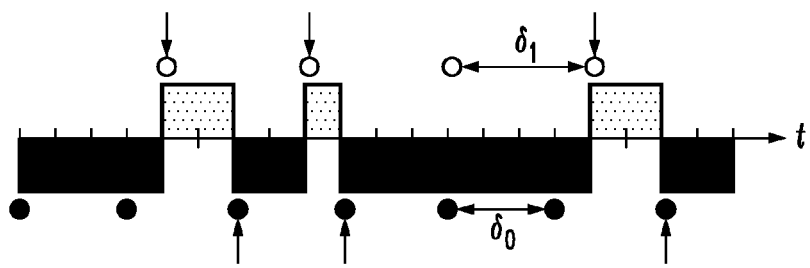

FIG. 5 shows a graphical representation of the above-described basic FlipIt game. The control of the resource is graphically depicted through shaded rectangles, a dark rectangle representing a period of defender's control, while a light rectangle one of attacker's control. Player's moves are graphically depicted with shaded circles. We include a vertical arrow at the time of a takeover, when a player takes control of the resource upon moving.

The description that follows will include analyzing "optimal play" for both attacker and defender in this simple game. We explore this question under various assumptions about the details of the rules, or about the strategies the players employ. We motivate next the choice of this game through several practical applications, and we show what different extensions of the basic game are needed to model these applications.

A number of applications will first be described. A prime motivation for FlipIt is the rise of APTs, which often play out as a protracted, stealthy contest for control of computing resources. FlipIt, however, finds many other applications in computer security, and even in other realms of trust assurance. Most of these applications correspond to slightly modified versions of the basic FlipIt game. To motivate exploration of FlipIt, we describe some of these other applications here, along with the extensions or modifications of the basic game required to model them.

As mentioned previously, an APT is a concerted, stealthy, and long-lived attack by a highly resourced entity against a critical digital resource. Stealth is a key characteristic: Attackers rely on extended reconnaissance and human oversight to minimize the risk of detection by the defender, which can quickly set back or thwart an APT. Similarly, a defender looks to conceal its knowledge of a detected APT, to avoid alerting the attacker and allowing it to achieve renewed stealth by changing its strategy. It should be noted that the term "persistent security threat" as used herein is intended to be broadly construed, and therefore is not limited to APTs, but more generally encompasses any type of attack in which an attacker takes multiple coordinated actions over a period of time.

In the case where the attacker looks to exercise persistent control over a set of target resources (as opposed to achieving a one-time mission), FlipIt can serve as a global model for an APT. The defender's sensitive assets may include computers, internal networks, document repositories, and so forth. In such a macro-level view, we treat all of these assets as an aggregate FlipIt resource that the defender wishes to keep "clean." The goal of the attacker is to compromise the resource and control it for a substantial fraction of time.

In this macro-level model, a move by the attacker may be a campaign that results in control over essential target resources, that is, a thorough breach of the system. A move by the defender may be a system-wide remediation campaign, e.g., patching of all machines in a network, global password refresh, reinstallation of all critical servers, etc.

The macro-level view of a defender's critical resources as a single FlipIt resource is attractively simple. A more realistic and refined model, however, models an APT as a series of stages along a path to system takeover, each stage individually treated as a micro-level FlipIt game. The adversary's global level of control at a given time, then, is a function of its success in each of these component games. We now give examples of some possible micro-level games.

Host Takeover.

In a host takeover version of the game, the target resource is a computing device. The goal of the attacker is to compromise the device by exploiting a software vulnerability or credential compromise. The goal of the defender is to keep the device clean through software reinstallation, patching, or other defensive security actions.

An action by either side carries a cost. For the attacker, the cost of host compromise may be that of, e.g., mounting a social-engineering attack that causes a user to open an infected attachment. For the defender, cleaning a host may carry labor and lost-productivity costs.

FlipIt provides guidance to the defender regarding how to implement a cost-effective schedule. For example, it can help the defender determine how often it should "clean" its host machines.

There are many ways to compromise or clean a host, with varying costs and criteria for success. In a refinement of the game, players might choose among a set of actions with varying costs and effectiveness.

For example, the attacker might choose between two types of move: (1) Use of a published exploit or (2) Use of a zero-day exploit, while the defender chooses either to: (1) Patch a machine or (2) Reinstall its software. For both players, (1) is the less expensive, but (2) the more effective. Action (2) results in takeover for either player, while action (1) will only work if the opponent's most recent move was action (1). For instance, patching a machine won't recover control from a zero-day exploit, but software reinstallation will.

Key Updates.

Another application of FlipIt is in key rotation or other types of key updates. A common hedge against the compromise of cryptographic keys is key rotation, the periodic generation and distribution of fresh keys by a trusted key-management service. Less common in practice, but well explored in the research literature is key-evolving cryptography, a related approach in which new keys are generated by their owner, either in isolation or jointly with a second party. In all of these schemes, the aim is for a defender to change keys so that compromise by an attacker in a given epoch (i.e., interval of time) doesn't impact the secrecy of keys in other epochs.

Forward-secure protocols protect the keys of past epochs, but not those of future epochs. Key-insulated and intrusion-resilient cryptography protect the keys of both past and future epochs, at the cost of involving a second party in key updates. Cryptographic tamper evidence provides a mechanism for detecting compromise when both the valid owner and the attacker make use of a compromised secret key.

Key updates in all of these schemes occur at regular time intervals, i.e., epochs are of fixed length. FlipIt provides a key insight here, namely the potential benefit of variable-length epochs.

The mapping of this scenario onto FlipIt depends upon the nature of the target key. An attacker can make use of a decryption key in a strongly stealthy way, i.e., can eavesdrop on communications without ready detection, and can also easily detect a change in key. In this case, the two players' knowledge is asymmetric. The defender must play non-adaptively, while the attacker has the option of a probe move at any time, i.e., can determine the state of the system at low cost.

Use of a signing key, on the other hand, can betray compromise by an attacker, as an invalidly signed message may appear anomalous by merit of its content.

To reflect the information disclosed by use of a signing key, we might consider a variant of FlipIt in which system state is revealed probabilistically. Compromise of a signing key by an attacker only comes to light if the defender actually intercepts a message signed by the attacker and determines from the nature of the signed message or other records that the signature is counterfeit. Similarly, the attacker only learns of a key update by the defender when the attacker discovers a signature by the defender under a key. In a further refinement, we might distinguish between moves that involve update or compromise of a key and those involving its actual use for signing.

Refreshing Virtual Machines.

Yet another application of FlipIt is in the context of refreshing virtual machines (VMs). Virtualization is seeing heavy use today in the deployment of servers in data centers. As individual servers may experience periods of idleness, consolidating multiple servers as VMs on a single physical host often results in greater hardware utilization. Similarly, Virtual Desktop Infrastructure (VDI) is an emerging workplace technology that provisions users with desktops comprising VMs maintained in centrally managed servers. In this model, users are not bound to particular physical machines. They can access their virtual desktops from any endpoint device available to them, potentially even on smart phones.

While virtualization exhibits many usability challenges, one key advantage is a security feature: VMs can be periodically refreshed (or built from scratch) from "clean" images, and data easily restored from backups maintained at the central server.

Takeover of a VM results in a game very similar to that for a physical host. Virtualization is of particular interest in the context of FlipIt, though, because FlipIt offers a means of measuring (or at least qualitatively illustrating) its security benefits. Refreshing a VM is much less cumbersome than rebuilding the software stack in a physical host. In other words, virtualization lowers the move cost for the defender. Optimal defender play will therefore result in resource control for a higher proportion of the time than play against a comparable attacker on a physical host. Techniques disclosed herein can be used to determine how refreshes of individual VMs can best be scheduled while maintaining service levels for a data center as a whole. In other words, these techniques can be used to determine how refresh schedules can best be crafted to meet the dual goals of security and avoidance of simultaneous outage of many servers/VDI instances.

Cloud Service Auditing.

A further FlipIt application is in the context of cloud service auditing. Cloud computing has a serious drawback, in that it requires users (often called "tenants") to rely on the trustworthiness of service providers for both reliability and security.

To return visibility to tenants, a number of audit protocols have been proposed that enable verification of service-level agreement (SLA) compliance by a cloud service provider. The strongest of these schemes are challenge-response protocols. In a Proof of Retrievability (PoR), for instance, a tenant challenges a cloud service provider to demonstrate that a stored file is remotely retrievable, i.e., is fully intact and accessible via a standard application interface. Other protocols demonstrate properties such as quality-of-service (QoS) levels, e.g., retention of a file in high-tier storage, and storage redundancy, i.e., distribution of a file across multiple hard drives.

Execution of an audit protocol carries a cost: A PoR, for instance, requires the retrieval of some file elements by the cloud and their verification by a tenant. Techniques disclosed herein can be used to determine, for example, the best way for a tenant to schedule challenges in an audit scheme.

Auditing for verification of SLA compliance is particularly amenable to modeling in FlipIt. A move by the defender (tenant) may be a challenge/audit, one that forces the provider into compliance (e.g., placement of a file in high-tier storage) if it has lapsed. A move by the attacker (cloud) is a downgrading of its service level in violation of an SLA (e.g., relegation of a file to a low storage tier). The metric of interest is the fraction of time the provider meets the SLA.

Password Reset.

Another application for the FlipIt game is password reset. When an account or other resource is password-protected, control by its owner relies on the password's secrecy. Password compromise may be modeled as a FlipIt game in which a move by the attacker results in its learning the password. For example, the attacker may run a password cracker or purchase a password in an underground forum. The defender regains control by resetting the password, and thus restoring its secrecy.

This game differs somewhat from basic FlipIt. An attacker can detect the reset of a password it has compromised simply by trying to log into the corresponding account. A defender, though, doesn't learn on resetting a password whether it has been compromised by an attacker. Thus, the defender can only play non-adaptively, while the attacker has a second move option available, a probe move that reveals the state of control of the resource.

3 FlipIt Notation, Parameters and Other Features

Detailed notation used to describe FlipIt games herein will be described in this section, followed by other parameters and features of FlipIt games. It is to be appreciated, however, that this description is presented by way of example only, and other embodiments can utilize other types of game-theoretic modeling in order to determine optimal scheduling of defensive security actions in an information processing system.

Players.

There are two players: The defender is the "good" player, identified with 0. The attacker is the "bad" player, and is identified with 1. It is convenient to treat the game as symmetric between the two players.

Time.

The game begins at time t=0 and continues indefinitely as t→∞. In the general form of the game, time is viewed as being continuous, but we also support a version of the game with discrete time.

Game State.

The time-varying variable $C=C(t)$ denotes the current state of the game, the player controlling the resource at time t; $C(t)$ is either 0 or 1 at any time t. We say that the game is in a "good state" if $C(t)=0$, and in a "bad state" if $C(t)=1$.

For i=0,1 we also let $$C_i(t)=I(C(t)=i)$$

denote whether the game is in a good state for player i at time t. Here I is an "indicator function": $(\bullet)=1$ if its argument is true, and 0 otherwise. Thus, $C_1(t)=C(t)$ and $C_0(t)=1-C_1(t)$. The use of $C_0$ and $C_1$ allows us to present the game in a symmetric manner.

The game begins with the game in a good state: $C(0)=0$.

Moves.

A player may "move" (e.g., push its button) at any time, but is only allowed to push its button a finite number of times in any finite time interval. He may not, for example, push its button at times 1/2, 2/3, 3/4, . . . , as this means pushing its button an infinite number of times in the time interval [0,1]. One could even impose an explicit lower bound on the time allowed between two button pushes by the same player.

A player cannot move more than once at a given time. We allow different players to play at the same time, although with typical strategies this happens with probability 0. If it does happen, then the moves "cancel" and no change of state happens. This way of tie-breaking makes the game fully symmetric, which we prefer to alternative approaches such as giving a preference to one of the players when breaking a tie. It is convenient to have a framework that handles ties smoothly, since discrete versions of the game, wherein all moves happen at integer times, might also be of interest. In such variants ties may be relatively common.

We denote the sequence of move times, for moves by both players, as an infinite nondecreasing sequence $$t=t_1,t_2,t_3, \ldots$$

The sequence might be nondecreasing, rather than strictly increasing, since we allow the two players move at the same time.

We let $p_k$ denote the player who made the k-th move, so that $p_k \in \{0,1\}$. We let p denote the sequence of player identities:

$$p=p_1,p_2,p_3, \ldots$$

We assume that $t_1=0$ and $p_1=0$; the good player (the defender) moves first at time $t=0$ to start the game.

For i=0,1 we let $$t_i=t_{i,1},t_{i,2},t_{i,3}, \ldots$$

denote the infinite increasing sequence of times when player i moves.

The sequences $t_0$ and $t_1$ are disjoint subsequences of the sequence t. Every element $t_k$ of t is either an element $t_{0,i}$ of $t_0$ or an element $t_{1,j}$ of $t_1$.

The game's state variable $C(t)$ denotes the player who has moved most recently (not including the current instant t), so that $$C(t)=p_k \text{ for } t_k < t \leq t_{k+1} \text{ and for all } k \geq 1.$$

When $C(t)=i$ then player i has moved most recently and is "in control of the game," or "in possession of the resource." We assume that $C(0)=0$.

Note that $C(t_k)=p_{k-1}$; this is convenient for our development, since if a player moves at time $t_k$ then $C(t_k)$ denotes the player who was previously in control of the game (which could be either player).

For compatibility with our tie-breaking rule, we assume that if $t_k=t_{k+1}$ (a tie has occurred), then the two moves at times $t_k$ and $t_{k+1}$ have subscripts ordered so that no net change of state occurs. That is, we assume that $p_k=1-C(t_k)$ and $p_{k+1}=1-p_k$. Thus, each button push causes a change of state, but no net change of state occurs.

We let $n_i(t)$ denote the number of moves made by player i up to and including time t, and let $$n(t)=n_0(t)+n_1(t)$$

denote the total number of moves made by both players up to and including time t.

For t>0 and i=0,1, we let $\alpha_i(t) = n_i(t)/t$ denote the average move rate by player i up to time t, and let $$\alpha(t) = \alpha_0(t) + \alpha_1(t)$$
$$= n(t)/t$$

denote the total average move rate.

We let $r_i(t)$ denote the time of the most recent move by player i; this is the largest value of $t_{i,k}$ that is less than t (if player i did not move since the beginning of the game, then we define $r_i(t) = -1$). Player 0 always moves at time 0, and therefore $r_0(t) \geq 0$. We let $r(t) = \max(r_0(t), r_1(t)) \geq 0$ denote the time of the most recent move by either player.

Feedback During the Game.

We distinguish various types of feedback that a player may obtain during the game (specifically upon moving). It is an interesting aspect of this game that the players do not automatically find out when the other player has last moved; moves are stealthy. A player must move himself to find out (and reassert control).

We let $\phi_i(t_k)$ denote the feedback player i obtains when the player moves at time $t_k$. This feedback may depend on which variant of the game is being played.

Non-Adaptive [NA].

In this case, a player does not receive any useful feedback whatsoever when he moves; the feedback function is constant.

$\phi_i(t_k) = 0$

Last Move [LM].

The player moving at time $t_k > 0$ finds out the exact time when the opponent played last before time $t_k$. That is, player i learns the value:

$\phi_i(t_k) = r_{1-i}(t_k)$

Full History [FH].

The mover finds out the complete history of moves made by both players so far:

$\phi_i(t_k) = ((t_1, t_2, \ldots, t_k), (p_1, p_2, \ldots, p_k))$.

We abbreviate these forms of feedback as NA, LM and FH, and we define other types of feedback elsewhere herein. We consider non-adaptive (NA) feedback to be the default (i.e., standard) version of the game. When there is feedback and the game is adaptive, then players interact in a meaningful way and therefore cooperative (e.g., "tit-for-tat") strategies may become relevant.

Views and History.

A view is the history of the game from one player's viewpoint, from the beginning of the game up to time t. It lists every time that player moved, and the feedback received for that move.

For example, the view for player i at time t is the list:

$v_i(t) = ((t_{i,1}, \phi(t_{i,1})), (t_{i,2}, \phi(t_{i,2})), \ldots, (t_{i,j}, \phi(t_{i,j})))$ where $t_{i,j}$ is the time of player i's j-th move, its last move up to time t, and $\phi(t_{i,j})$ is the feedback player i obtains when making its j-th move.

A history of a game is the pair of the players' views.

Strategies.

A strategy for playing this game is a (possibly randomized) mapping S from views to positive real numbers. If S is a strategy and v a view of length j, then S(v) denotes the time for the player to wait before making move j+1, so that $t_{i,j+1} = t_{i,j} + S(v)$.

The next view for the player following strategy S will thus be $((t_{i,1}, \phi(t_{i,1})), (t_{i,2}, \phi(t_{i,2})), \ldots, (t_{i,j+1}, \phi(t_{i,j+1})))$.

We define now several classes of strategies.

Non-Adaptive Strategies:

We say that a strategy is non-adaptive if it does not require feedback received during the game, and we denote by $\mathcal{N}$ the class of all non-adaptive strategies. A player with a non-adaptive strategy plays in the same manner against every opponent. A player with a non-adaptive strategy can generate the time sequence for all of its moves in advance, since they don't depend on what the other player does. They may, however, depend on some independent source of randomness; non-adaptive strategies may be randomized.

Renewal Strategies:

Renewal strategies are non-adaptive strategies for which the intervals between consecutive moves are generated by a renewal process. Therefore, the inter-arrival times between moves are independent and identical distributed random variables chosen from a probability density function $f$. As the name suggests, these strategies are "renewed" after each move: the interval until the next move only depends on the current move time and not on previous history.

Periodic Strategies:

An example of a simple renewal strategy is a periodic strategy. We call a strategy periodic if there is a $\delta$ such that the player always pushes its button again once exactly $\delta$ seconds have elapsed since its last button-push. We assume that the periodic strategy has a random phase, i.e., the first move is selected uniformly at random from interval $[0, \delta]$ (if the strategy is completely deterministic the opponent can find out the exact move times and schedule its moves accordingly).

Exponential Strategies:

We call a strategy exponential if the player pushes its button in a Poisson manner: there is some rate $\alpha$ such that in any short time increment $\Delta$ the probability of a button-push is approximately $\alpha \cdot \Delta$. In this case, S(v) has an exponential distribution and this results in a particular instance of a renewal strategy.

Adaptive Strategies:

The class of adaptive strategies encompasses strategies in which players receive feedback during the game. In the LM-adaptive class of strategies denoted $\mathcal{A}_{LM}$, a player receives last-move feedback, while in the FH-adaptive class denoted $\mathcal{A}_{FH}$ a player receives full history feedback, as previously defined.

No-Play Strategies:

We denote by $\Phi$ the strategy of not playing at all (effectively dropping out of the game). We will show that this strategy is sometimes the best response for a player against an opponent playing extremely fast.

Information Received Before the Game Starts.

Besides receiving feedback during the game, sometimes players receive additional information about the opponent before the game starts. We capture this with $\phi_i(0)$, which denotes the information received by player i before the game starts. There are several cases we consider:

Rate of Play [RP].

In this version of the game, player i finds out the limit of the rate of play $\alpha(t)$ of its opponent at the beginning of the game (assuming that the rate of play converges to a finite value):

$$\phi_i(0) = \lim_{t \to \infty} \alpha(t)$$

However, no additional information is revealed to the player about its opponent's moves during the game.

Knowledge of Strategy [KS].

Player i might find additional information about the opponent's strategy. For instance, if the opponent (player 1−i) employs a renewal strategy generated by probability density function $f$, then KS information for player i is the exact distribution $f$:

$\phi_i(0) = f$

Knowledge of the renewal distribution in this case does not determine uniquely the moves of player 1−i, as the randomness used by player 1−i is not divulged to player i. In one or more embodiments, we only use KS in conjunction with renewal strategies, but the concept could be generalized to other classes of strategies.

We make the observation that the latter two definitions can be applied meaningfully only to a non-adaptive adversary. An adaptive adversary from class LM or FH can estimate the rate of play of the defender, as well as the strategy during the game from the information received when moving. But a non-adaptive adversary receiving RP or KS information before the game starts can adapt its strategy and decide on its moves based on the additional knowledge about the opponent's strategy.

The information received at the beginning of the game, hence, could be used, in conjunction with the feedback received while moving, to determine the strategy of playing the game. We can more formally extend the definition of views to encompass this additional amount of information as:

$v_i(t)=(\phi_i(0),((t_{i,1},\phi(t_{i,1})),(t_{i,2},\phi(t_{i,2})), \ldots ,(t_{i,j},\phi(t_{i,j}))))$ Gains and Benefits.

Players receive benefit equal to the number of time units for which they are the most recent mover, minus the cost of making their moves. We denote the cost of a move for player i by $k_i$; it is important for our modeling goals that these costs could be quite different.

Player i's total gain $G_i$ in a given game (before subtracting off the cost of moves) is just the integral of $C_i$:

$G_i(t)=\int_0^t C_i(t)dt$

Thus $G_i(t)$ denotes the total amount of time that player i has owned the resource (i.e., controlled the game) from the start of the game up to time t, and $G_0(t)+G_1(t)=t$ The average gain rate for player i is defined as:

$\gamma_i(t)=G_i(t)/t$ so that $\gamma_i(t)$ is the fraction of time that player i has been in control of the game up to time t. Thus, for all t>0:

$\gamma_0(t)+\gamma_1(t)=1$.

We let $B_i(t)$ denote player i's net benefit up to time t; this is the gain (total possession time) minus the cost of player i's moves so far:

$B_i(t)=G_i(t)-k_i n_i(t)$.

We also call $B_i(t)$ the score of player 1 at time t. The maximum benefit $B_0(t)=t-1$ for player 0 would be obtained if neither player moved again after player 0 took control at time t=0.

We let $\beta_i(t)$ denote player i's average benefit rate up to time t:

$\beta_i(t)=B_i(t)/t=\gamma_i(t)-k_i\alpha_i(t)$;

this is equal to the fraction of time the resource has been owned by player i, minus the cost rate for moving.

In a given game, we define player i's asymptotic benefit rate or simply benefit as $$\beta_i = \liminf_{t \to \infty} \beta_i(t).$$

We use liminf since $\beta_i(t)$ may not have limiting values as t increases to infinity.

An alternative standard and reasonable approach for summarizing an infinite sequence of gains and losses would be to use a discount rate $\lambda<1$ so that a unit gain at future time t is worth only $\lambda^t$. The previous approach is simpler when at least one of the players is non-adaptive, so we'll omit consideration of the alternative approach here.

While we have defined the benefit for a given game instance, it is useful to extend the notion over strategies. Let $S_i$ be the strategy of player 1, for $i\in\{0,1\}$. Then the benefit of player i for the FlipIt game given by strategies $(S_0, S_1)$ is:

$$\beta_i(S_0, S_1) = \lim_{n \to \infty} \frac{1}{n} \sum_{j=1}^n \beta_i^{(j)},$$

where $\{\beta_i^{(j)}\}_{j=1}^n$ are the benefits obtained by player 1 in n different instances of the game played according to strategies $(S_0, S_1)$.

Game-Theoretic Definitions.

We denote by FlipIt($\mathcal{C}_0$, $\mathcal{C}_1$) the FlipIt game in which player i chooses a strategy from class $\mathcal{C}_i$, for $i\in\{0,1\}$. For a particular choice of strategies $S_0\in\mathcal{C}_0$ and $S_1\in\mathcal{C}_1$, the benefit of player i is defined as above. In the FlipIt game, benefits may be viewed as similar to the notion of utility used in game theory.

Using terminology from game theory, a strategy $S_0\in\mathcal{C}_0$ is strongly dominated for player 0 in game FlipIt($\mathcal{C}_0$, $\mathcal{C}_1$) if there exists another strategy $S'_0\in\mathcal{C}_0$ such that:

$\beta_0(S_0,S_1)<\beta_0(S'_0,S_1),\forall S_1\in\mathcal{C}_1$

A strategy $S_0$ is dominant for player 0 in game FlipIt($\mathcal{C}_0$, $\mathcal{C}_1$) if:

$\beta_0(S_0,S_1)>\beta_0(S'_0,S_1),\forall S'_0\in\mathcal{C}_0,\forall S_1\in\mathcal{C}_1$ Similar definitions can be given for player 1 since the game is fully symmetric.

There is an implicit assumption in the game theory literature that a rational player does not choose to play a strategy that is strongly dominated by other strategies. Therefore, elimination of strongly dominated strategies for both players is a standard technique used to reduce the space of strategies available to each player. We denote by FlipIt*($\mathcal{C}_0$, $\mathcal{C}_1$) the residual FlipIt game consisting of surviving strategies after elimination of strongly dominated strategies from classes $\mathcal{C}_0$ and $\mathcal{C}_1$. A rational player will always choose a strategy from the residual game.

A Nash equilibrium for the game FlipIt($\mathcal{C}_0$, $\mathcal{C}_1$) is a pair of strategies $(S_0, S_1)\in\mathcal{C}_0\times\mathcal{C}_1$ such that:

$\beta_0(S_0,S_1)\geq\beta_0(S'_0,S_1),\forall S'_0\in\mathcal{C}_0$ $\beta_1(S_0,S_1)\geq\beta_1(S_0,S'_1),\forall S'_1\in\mathcal{C}_1$

4 Non-Adaptive Renewal Games

In this section, we start our theoretical analysis of the FlipIt game with a simple, but interesting class of games. We consider strategies that are "renewed" after each move. A player decides on its set of moves without receiving any feedback about its opponent during the game or taking into consideration the history of previous moves. Each player's move times depend only on the time he moved last, and on some fixed distribution from which the interval between moves is chosen independently and uniformly at random.

In this class of strategies, called renewal strategies, the intervals between each player's move times are generated by a renewal process, a well-studied type of stochastic process. We analyze the FlipIt game played with either renewal or periodic strategies, finding Nash equilibria for particular instances of the game, determining strongly dominated and dominant strategies (if they exist), and characterizing the residual game.

Our main result in this section demonstrates that renewal strategies are strongly dominated by periodic strategies, and the surviving strategies in the residual FlipIt game are the periodic strategies. In addition, in the subclass of renewal strategies with a fixed rate of play, the periodic strategy is the dominant one.

We also analyze in depth the FlipIt game in which both players employ a periodic strategy with a random phase. We compute the Nash equilibria for different conditions on move costs, and discuss the choice of the rate of play when the adversary receives feedback according to NA and RP definitions given above.

4.1 Playing Periodically

We start this section by analyzing a very simple instance of the FlipIt game. We consider a non-adaptive continuous game in which both players employ a periodic strategy with a random phase. If the strategy of one player is completely deterministic, then the opponent has complete information about the deterministic player's move times and therefore could schedule its moves to control the resource at all times. For this reason, we introduce some randomness in the periodic strategy through the first move, which can be selected uniformly at random from some interval.

More specifically, a periodic strategy with random phase is characterized by the fixed interval between consecutive moves, denoted $\delta$. We assume that the first move called phase is chosen uniformly at random in interval $[0, \delta]$. The average play rate (not considering the first move) is given by $\alpha=1/\delta$. We denote by $P_\alpha$ the periodic strategy with random phase of rate $\alpha$ and $\mathcal{P}$ the class of all periodic strategies with random phases:

$$\mathcal{P} = \{P_\alpha | \alpha > 0\}$$

We consider the FlipIt game in which player i employs strategy $P_{\alpha_i}$. Let $\delta_i = 1/\alpha_i$ be the period, and $k_i$ the move cost of player i, for $i \in \{0, 1\}$. The game is graphically depicted in FIG. 6.

Computing Benefits.

For the periodic game defined above, the benefits of both players depend on rates of play $\alpha_0$ and $\alpha_1$. We denote therefore the benefit of player i by $\beta_i(\alpha_0, \alpha_1)$. To compute both players' benefits, we consider two cases:

Case 1: $\alpha_0 \geq \alpha_1$ (The defender plays as least as fast as the attacker)

Let $r = \delta_0/\delta_1$. The intervals between two consecutive defender's moves have length $\delta_0$, and the attacker moves in each interval with probability r. When the attacker moves in an interval, he can move at any point in that interval uniformly at random (since he uses a random phase). Thus the attacker controls the resource on average a fraction r/2 of time. We can then express the players' benefits as:

$$\beta_0(\alpha_0, \alpha_1) = 1 - \frac{r}{2} - k_0\alpha_0 = 1 - \frac{\alpha_1}{2\alpha_0} - k_0\alpha_0$$

$$\beta_1(\alpha_0, \alpha_1) = \frac{r}{2} - k_1\alpha_1 = \frac{\alpha_1}{2\alpha_0} - k_1\alpha_1$$

Case 2: $\alpha_0 \leq \alpha_1$ (The defender plays no faster than the attacker)

With a similar analysis, players' benefits are:

$$\beta_0(\alpha_0, \alpha_1) = \frac{\alpha_0}{2\alpha_1} - k_0\alpha_0$$

$$\beta_1(\alpha_0, \alpha_1) = 1 - \frac{\alpha_0}{2\alpha_1} - k_1\alpha_1$$

Nash Equilibria.

As a second step, we are interested in finding Nash equilibria, points for which neither player will increase its benefit by changing its rate of play. More formally, a Nash equilibrium for the periodic game is a point $(\alpha_0^*, \alpha_1^*)$ such that the defender's benefit $\beta_0(\alpha_0, \alpha_1^*)$ is maximized at $\alpha_0 = \alpha_0^*$ and the attacker's benefit $\beta_1(\alpha_0^*, \alpha_1)$ is maximized at $\alpha_1 = \alpha_1^*$.

We make some useful notation. We denote by $\text{opt}_0(\alpha_1)$ the set of values (rates of play $\alpha_0$) that optimize the benefit of the defender for a fixed rate of play $\alpha_1$ of the attacker. Similarly, we denote by $\text{opt}_1(\alpha_0)$ the set of values (rates of play $\alpha_1$) that optimize the benefit of the attacker for a fixed rate of play $\alpha_0$ of the defender. It can be shown that the FlipIt game FlipIt($\mathcal{P}, \mathcal{P}$) in which both players employ periodic strategies with random phases has the following Nash equilibria:

$$k_0 < k_1 \quad \alpha_0^* = \frac{1}{2k_1}; \alpha_1^* = \frac{k_0}{2k_1^2}$$

$$k_0 = k_1 \quad \alpha_0^* = \alpha_1^* = \frac{1}{2k_0}$$

$$k_0 > k_1 \quad \alpha_0^* = \frac{k_1}{2k_0^2}; \alpha_1^* = \frac{1}{2k_0}$$

Figure 9:
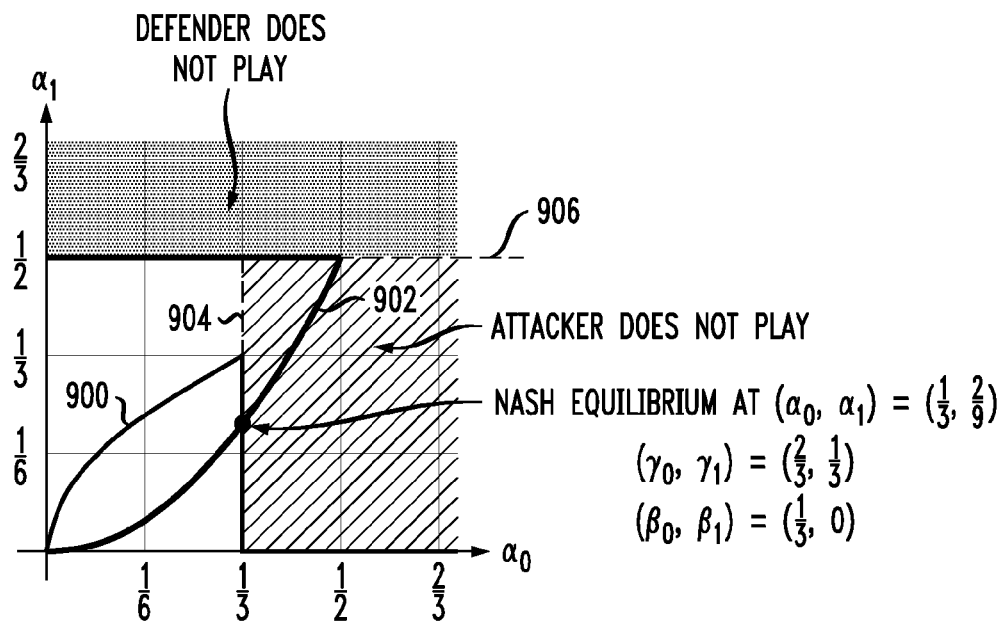
FIG. 9 is a plot showing a Nash equilibrium for a periodic stealthy takeover game of the type shown in FIG. 6.
Figure 10:
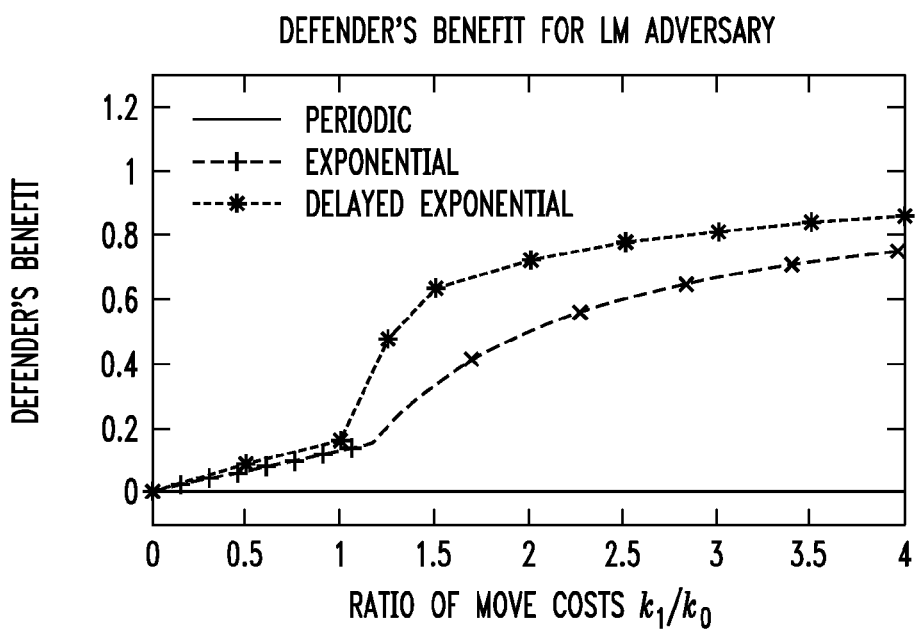
FIG. 10 is a plot of defender benefit as a function of a ratio of move costs in a stealthy takeover game.

FIG. 9 shows the Nash equilibrium for a game with periodic attacker and periodic defender and move costs $k_0=1$ and $k_1=1.5$. The optimal strategy $\text{opt}_0$ of the defender is depicted by curve 900, and the optimal strategy of the attacker $\text{opt}_1$ is depicted by curve 902, as a function of move costs. The unique Nash equilibrium occurs at the intersection of the curves 900 and 902. Also shown in the figure are regions corresponding to cases for which it is optimal for the defender, and the attacker, respectively, not to move at all (i.e., when $\text{opt}_0(\alpha_1)=0$ or $\text{opt}_1(\alpha_0)=0$, respectively). These regions are the region to the right of dashed line 904 for the attacker, and the region above dashed line 906 for the defender.

Parameter Choices.

Parameter choices have an impact on the benefits achieved by both players in the game. The periodic strategy with random phase for player i is uniquely determined by choosing rate of play $\alpha_i$. Again, in the non-adaptive version of the game neither player has any information about the opponent's strategy (expect for the move costs, which we assume are known at the beginning of the game). Therefore, players need to decide upon a rate of play based only on knowledge of the move costs.

Generally, the player with a lower move cost has an advantage on its opponent. Therefore, an important lesson derived from FlipIt is that by lowering the move cost a player can obtain higher benefit, no matter how the opponent plays. When move costs are equal, both players can achieve similar benefits, and neither has an advantage over the other. As expected, the benefits of both players are negatively affected by increasing the move costs. Also, playing too fast results eventually in negative benefit, as the cost of the moves exceeds that of the gain achieved from controlling the resource.

Forcing the Attacker to Drop Out.

If the defender plays extremely fast (periodic with rate $\alpha_0 \geq 1/2k_1$), the attacker's dominant non-adaptive strategy is to drop out of the game. The reason is that in each interval between defender's consecutive moves (of length $\delta_0 = 1/\alpha_0 \leq 2k_1$), the attacker can control the resource on average at most half of the time, resulting in gain at most $k_1$. However, the attacker has to spend $k_1$ for each move, and therefore the benefit in each interval is negative.

We can characterize the residual FlipIt game in this case:

$$\text{FlipIt}^*(P_{1/2k_1}, =\mathcal{N}) = \text{FlipIt}(P_{1/2k_1}, \Phi)$$

4.2 General Renewal Strategies

We analyze now the general case of non-adaptive renewal games. In this class of games both players' strategies are non-adaptive and the inter-arrival times between each player's moves are produced by a renewal process (characterized by a fixed probability distribution). We start by presenting some well-known results from renewal theory that will be useful in our analysis and then present a detailed analysis of the gains and benefits achieved in the renewal game.

Renewal Theory Results.

Let $\{X_n\}_{n \geq 0}$ be independent and identically distributed random variables chosen from a common probability density function $f$. Let F be the corresponding cumulative distribution function. $\{X_n\}_{n \geq 0}$ can be interpreted as inter-arrival times between events in a renewal process: the n-th event arrives at time $S_n = \Sigma_{i=0}^n X_i$. Let $\mu = E[X_n]$, for all $n \geq 0$.

A renewal process generated by probability density function $f$ is called arithmetic if arrivals occur only at integer multiples of a real number d. The span of an arithmetic distribution is the largest d for which this property holds. A renewal process with d=0 is called non-arithmetic.

For a random variable X given by a probability density function $f$, corresponding cumulative distribution F, and expected value $\mu = E[X]$, we define the size-bias density function as:

$$f^*(z) = \frac{1 - F(z)}{\mu}$$

and the size-bias cumulative distribution function as:

$$F^*(z) = \frac{\int_{x=0}^{z} (1 - F(x)) dx}{\mu}$$

The age function Z(t) of a renewal process is defined at time interval t as the time since the last arrival. Denote by $f_{Z(t)}$ and $F_{Z(t)}$ the age density and cumulative distribution functions, respectively. It can be shown that the age density and cumulative distribution functions are converging, as t goes to ∞, to the size-bias density and cumulative distribution functions, respectively. More particularly, for a non-arithmetic renewal process given by probability density function $f$, the age density and cumulative distribution functions converge as:

$$\lim_{t \to \infty} f_{Z(t)}(z) = f^*(z)$$

$$\lim_{t \to \infty} F_{Z(t)}(z) = F^*(z)$$

Playing FlipIt with Renewal Strategies.

A renewal strategy for a player is a strategy in which the player's moves are generated by a renewal process. In a non-arithmetic renewal strategy, the player's moves are generated by a non-arithmetic renewal process. We denote by $R_f$ the renewal strategy generated by a non-arithmetic renewal process with probability density function $f$, and by $\mathcal{R}$ the class of all non-arithmetic renewal strategies:

$$\mathcal{R} = \{R_f | f \text{ is non-arithmetic probability density function}\}$$

Here we consider the FlipIt game in which both players employ non-arithmetic renewal strategies: player i uses strategy $R_{f_i}$. Let us denote the intervals between defender's moves as $\{X_n\}_{n \geq 0}$ and the intervals between attacker's moves as $\{Y_n\}_{n \geq 0}$. $\{X_n\}_{n \geq 0}$ are identically distributed random variables chosen independently from probability density function $f_0$ with average $\mu_0$, while $\{Y_n\}_{n \geq 0}$ are independent identically distributed random variables chosen from probability density function $f_1$ with average $\mu_1$. Let $\alpha_i = 1/\mu_i$ be the rate of play of player i.

We denote the corresponding cumulative distribution functions as $F_0$ and $F_1$. Since both renewal processes are non-arithmetic, we can infer that the age density and cumulative distribution functions of both processes converge. Denote by $f_0^*$, $f_1^*$ and $F_0^*$, $F_1^*$ the size-bias density and cumulative distribution functions for the two distributions.

Figure 7:
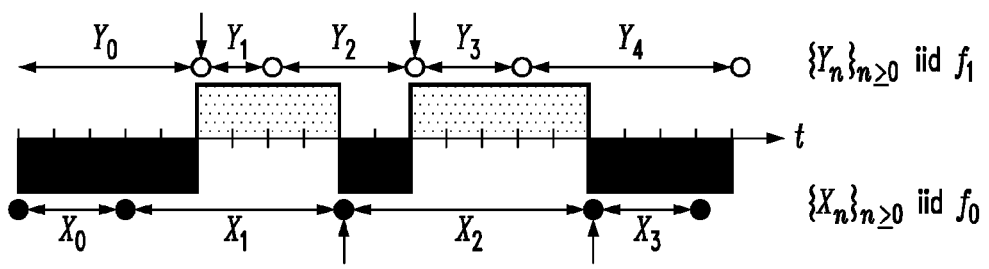

A graphical representation of this game is given in FIG. 7. The defender and attacker play with inter-arrival times independent identically distributed (iid) from probability distributions $f_0$ and $f_1$, respectively.

In the non-adaptive FlipIt renewal game FlipIt($\mathcal{R}, \mathcal{R}$), the players' benefits for strategies $(R_{f_0}, R_{f_1}) \in \mathcal{R} \times \mathcal{R}$ are:

$$\beta_0(R_{f_0}, R_{f_1}) = \int_{x=0}^{\infty} f_1^*(x) F_0^*(x) dx - k_0 \alpha_0$$

$$\beta_1(R_{f_0}, R_{f_1}) = \int_{x=0}^{\infty} f_0^*(x) F_1^*(x) dx - k_1 \alpha_1$$

This result can be generalized to strategies from class $\mathcal{R} \cup \mathcal{P}$. For strategies from class $\mathcal{P}$, we consider below the size-bias density and cumulative distribution functions of the underlying periodic distribution. In more detail, for strategy $P_\alpha \in \mathcal{P}$, the density and cumulative distribution of the underlying periodic distribution are:

$$f(x) = \begin{cases} 1, & x = \frac{1}{\alpha} \\ 0, & x \neq \frac{1}{\alpha} \end{cases} \quad F(x) = \begin{cases} 0, & x < \frac{1}{\alpha} \\ 1, & x \geq \frac{1}{\alpha} \end{cases}$$

Then the size-bias density and cumulative distribution functions for the periodic distribution are:

$$f^*(x) = \begin{cases} \alpha, & x < \frac{1}{\alpha} \\ 0, & x \geq \frac{1}{\alpha} \end{cases} \quad F^*(x) = \begin{cases} \alpha x, & x < \frac{1}{\alpha} \\ 1, & x \geq \frac{1}{\alpha} \end{cases}$$

With this convention, it can be shown that, in the non-adaptive FlipIt game FlipIt($\mathcal{R} \cup \mathcal{P}$, $\mathcal{R} \cup \mathcal{P}$), the players' benefits for strategies $(S_0, S_1) \in (\mathcal{R} \cup \mathcal{P}) \times (\mathcal{R} \cup \mathcal{P})$ are:

$$\beta_0(S_0, S_1) = \int_{x=0}^{\infty} f_1^*(x) F_0^*(x) dx - k_0 \alpha_0$$

$$\beta_1(S_0, S_1) = \int_{x=0}^{\infty} f_0^*(x) F_1^*(x) dx - k_1 \alpha_1$$

4.3 the Residual Renewal Game

We are now able to completely analyze the FlipIt game with strategies in class $\mathcal{R} \cup \mathcal{P}$. We show first that for a fixed rate of play $\alpha_i$ of player i the periodic strategy is a dominant strategy for player i (or, alternatively, all non-arithmetic renewal strategies are strongly iteratively eliminate the strongly dominated strategies, the surviving strategies in the residual game FlipIt*($\mathcal{R} \cup \mathcal{P}$, $\mathcal{R} \cup \mathcal{P}$) are the periodic strategies.

For a fixed $\alpha > 0$, we denote by $\mathcal{R}_\alpha$ the class of all non-arithmetic renewal strategies of fixed rate $\alpha$, and by $\mathcal{P}_\alpha$ the class of all periodic strategies of rate $\alpha$. As there exists only one periodic strategy of rate $\alpha$, $\mathcal{R}_a = \{P_\alpha\}$. It can be shown that:

1. For a fixed rate of play $\alpha_0$ of player 0, strategy $P_{\alpha_0}$ is a dominant strategy for player 0 in game FlipIt($\mathcal{R}_{\alpha_0} \cup \mathcal{P}_{\alpha_0}$, $\mathcal{R} \cup \mathcal{P}$). A similar result holds for player 1.
2. The surviving strategies in the residual FlipIt game FlipIt($\mathcal{R} \cup \mathcal{P}$, $\mathcal{R} \cup \mathcal{P}$) are strategies from class $\mathcal{P}$:

FlipIt*($\mathcal{R} \cup \mathcal{P}$, $\mathcal{R} \cup \mathcal{P}$)=FlipIt($\mathcal{P}$, $\mathcal{P}$)

The foregoing results also hold if one or both players receive information at the beginning of the game according to the RP definition.

4.4 Renewal Games with an RP Adversary

In the case in which one player (assume the adversary) receives feedback according to RP (i.e., knows the rate of play of the defender), we can provide more guidance to players on choosing their rates of play for achieving maximum benefit. In particular, we consider a scenario in which the adversary knows the rate of play of the defender, and we assume that the adversary plays rationally in the sense that he tries to maximize its benefit: For a fixed rate of play $\alpha_0$ of the defender, the adversary chooses to play with rate $\alpha_1^* = \text{argmax } \beta_1(\alpha_0, \cdot)$. Under this circumstance, the defender can also determine for each fixed rate of play $\alpha_0$, the rate of play $\alpha_1^*$ of a rational adversary. It is then rational for the defender to pick the rate of play $\alpha_0^*$ that maximizes its own benefit: $\alpha_0^* = \text{argmax } \beta_0(\cdot, \alpha^{1*})$.

It is possible to determine exact values of $\alpha_0^*$ and $\alpha_1^*$, as well as maximum benefits achieved by playing at these rates. Consider the periodic FlipIt game with NA defender and RP attacker. Assume that the attacker always chooses its rate of play to optimize its benefit: $\alpha_1^* = \text{argmax } \beta_1(\alpha_0, \cdot)$ given a fixed rate of play of the defender $\alpha_0$, and the defender chooses its rate of play $\alpha_0^*$ that achieves optimal benefit: $\alpha_0^* = \text{argmax } \beta_0(\cdot, \alpha_1^*)$. Then:

1. For $k_1 < (4 - \sqrt{12})k_0$ the rates of play that optimize each player's benefit are:

$$\alpha_0^* = \frac{k_1}{8k_0^2}; \alpha_1^* = \frac{1}{4k_0}.$$

The maximum benefits for the players are:

$$\beta_0(\alpha_0^*, \alpha_1^*) = \frac{k_1}{8k_0}; \beta_1(\alpha_0^*, \alpha_1^*) = 1 - \frac{k_1}{2k_0}.$$

2. For $k_1 \geq (4 - \sqrt{12})k_0$ the rates of play that optimize each player's benefit are ($\downarrow$ denotes convergence from above):

$$\alpha_0^* \downarrow \frac{1}{2k_1}; \alpha_1^* = 0.$$

The maximum benefits for the players are:

$$\beta_0(\alpha_0^*, \alpha_1^*) = 1 - \frac{k_0}{2k_1}; \beta_1(\alpha_0^*, \alpha_1^*) = 0.$$

5 LM-Adaptive Attacker

In the previous section, we analyzed a non-adaptive instance of FlipIt in which both players employ non-arithmetic renewal or periodic strategies. We consider now a FlipIt game in which the defender is still playing with a renewal or periodic strategy, but the attacker is more powerful and receives feedback during the game. In particular, the attacker finds out the exact time of the defender's last move every time he moves, and is LM-adaptive according to the definition given previously. Also, for a defender playing with a renewal strategy, an LM-adaptive attacker is just as powerful as an FH-adaptive one.

This models a realistic scenario in which attackers have access to more information than defenders. For instance, attackers could guess with high confidence the interval of the last password change or key refresh of the defender. In this model, our goals are two-fold: first, we'd like to understand which renewal strategies chosen by the defender achieve high benefit against an adaptive attacker; second, we are interested in finding good adaptive strategies for the attacker, given a fixed distribution chosen by the defender.

We analyze this game for the defender playing with periodic and exponential distributions. For an LM-adaptive adversary, the periodic strategy is a poor choice, as the defender's benefit is always negative. For the defender playing with an exponential distribution, we prove that the attacker's dominant strategy is periodic play (with a rate depending on the defender's rate of play). We also define a new distribution called delayed exponential, in which the defender waits for a fixed interval of time before choosing an exponentially distributed interval until its next move. We show experimentally that for some parameter choices the delayed exponential distribution results in less frequent moves and, hence, increased benefit for the defender compared to exponential play.

5.1 Game Definition

In this version of the game, the defender plays with either a non-arithmetic renewal strategy from class $\mathcal{R}$ or with a periodic strategy with random phase from class $\mathcal{P}$. Hence, the inter-arrival times between defender's consecutive moves are given by independent and identically distributed random variables $\{X_n\}_{n \geq 0}$ from probability density function $f_0$.

The attacker is LM-adaptive and its inter-arrival move times are denoted by $\{Y_n\}_{n \geq 0}$. At its n-th move, the attacker finds out the exact time since the defender's last move, denoted $\tau_n$. The attacker determines the interval till its next move $Y_{n+1}$ taking into consideration the history of its own previous moves (given by $\{Y_i\}_{i=0}^n$), as well as $\tau_n$. Without loss of generality, the attacker doesn't consider times $\{\tau_i\}_{i<n}$ when determining interval $Y_{n+1}$ for the following reason. The defender "restarts" its strategy after each move, and thus knowledge of all the history $\{\tau_i\}_{i<n}$ doesn't help the attacker in improving its strategy.

Figure 8:
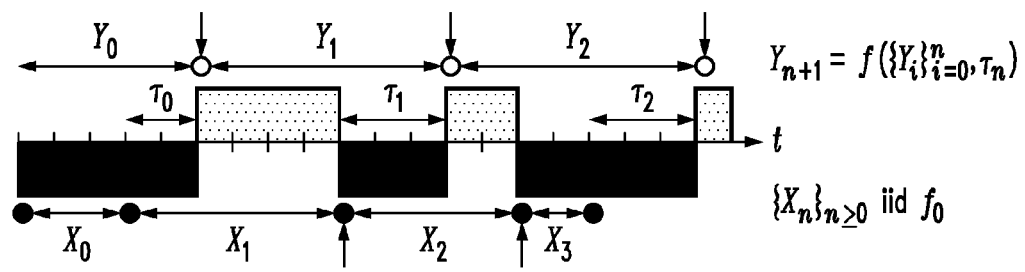

This game is graphically depicted in FIG. 8. The defender plays with inter-arrival times iid from distribution $f_0$. The attacker finds out upon moving the interval since defender's last move $\tau_n$.

It should be noted that an LM-adaptive attacker is as powerful as an FH-adaptive attacker against a renewal or periodic defender:

$$\text{FlipIt}(\mathcal{R} \cup \mathcal{P}, \mathcal{A}_{LM}) = \text{FlipIt}(\mathcal{R} \cup \mathcal{P}, \mathcal{A}_{FH})$$

The reason is that an FH-adaptive attacker, while receiving more feedback during than game than an LM-adaptive one, will only make use of the last defender's move in determining its strategy. Information about previous defender's moves does not provide any additional advantage since the defender's moves are independent from one another.

5.2 Defender Playing Periodically

We start by analyzing the simple game in which the defender plays with a periodic distribution with random phase given by period $\delta_0$. The attacker finds out after its first move the exact phase of the distribution (the time of the defender's first move denoted $X_0$). As such, the attacker knows the exact time of all future moves by the defender: $X_0 + \delta_0, X_0 + 2\delta_0, \ldots$ The dominant strategy for the attacker is then to play "immediately after" the defender, and control the resource all the time after the first move. However, when the defender plays sufficiently fast, it can force the attacker to drop out of the game. We distinguish two cases based on the defender's rate of play.

Case 1: $\alpha_0 < 1/k_1$

In this case the dominant attacker strategy is to play right after the defender. Therefore, the defender only controls the resource for a small time interval at the beginning of the game. We can prove that the gain of the defender is asymptotically 0 ($\gamma_0 = 0$) and that of the attacker converges to 1 ($\gamma_1 = 1$). The benefits of the players are:

$$\beta_0 = -k_0/\delta_0; \quad \beta_1 = 1 - k_1/\delta_0$$

Case 2: $\alpha_0 \geq 1/k_1$

In this case, the attacker would have to spend more budget on moving than the gain obtained from controlling the resource, resulting in negative or zero benefit. Therefore, the defender forces the attacker to drop out of the game.

Forcing the Attacker to Drop Out.

If the defender plays periodic with rate $1/k_1$, a FH-adaptive attacker's dominant strategy is not playing at all. Therefore all FH-adaptive attacker strategies are strongly dominated by the no-play strategy against a defender playing with strategy $P_{1/k_1}$ and we can characterize the residual FlipIt game in this case:

$$\text{FlipIt}^*(P_{1/k_1}, \mathcal{A}_{FH}) = \text{FlipIt}(P_{1/k_1}, \Phi)$$

The benefit achieved by the defender is $\beta_0 = 1 - k_0/k_1$.

This demonstrates that the periodic strategy with a random phase is a poor choice for the defender (unless the defender plays extremely fast), resulting always in negative benefit. This motivates us to search for other distributions that will achieve higher benefit for the defender in this version of the game.

5.3 Defender playing exponentially We analyze now the game in which the defender plays with an exponential distribution with rate $\lambda$, denoted $E_\lambda$. The exponential distribution is memoryless: in a renewal process with inter-arrival time between events distributed exponentially, at each moment in time the time till the next event is independent of the time passed since the last event. Intuitively, an LM-adaptive attacker finding out the time since defender's last move, has no advantage in predicting the time of the next move compared to a non-adaptive attacker. Accordingly, we can prove that strategies from the LM-adaptive class are strongly dominated by periodic strategies (and, hence, the attacker does not benefit from the additional feedback received during the game). More particularly, it can be shown that the dominant LM-adaptive strategy against a defender playing exponentially with rate $\lambda$ is a periodic strategy $P_\alpha \in \mathcal{P}$ (or no play at all).

Assuming that the defender's and the attacker's move costs are $k_0$ and $k_1$, respectively, and the period of the attacker's dominant strategy is $\delta = 1/\alpha$ (with the convention that delta $\to \infty$ for the no play strategy), the benefits for the players in game $\text{FlipIt}(E_\lambda, P_\alpha)$ are:

$$\beta_0(E_\lambda, P_\alpha) = 1 - \frac{1 - e^{-\lambda \delta}}{\lambda \delta} - \lambda k_0$$

$$\beta_1(E_\lambda, P_\alpha) = \frac{1 - e^{-\lambda \delta}}{\lambda \delta} - \frac{k_1}{\delta}$$

Also, there is a relationship between the period $\delta$ of the dominant LM-adaptive attacker strategy and the rate $\lambda$ of the defender's exponential distribution. Assume that the defender plays with an exponential distribution $E_\lambda$ with fixed rate $\lambda$. Then:

1. If $\lambda < 1/k_1$, the LM-adaptive dominant strategy is $P_\alpha$ with period $\delta = 1/\alpha$ satisfying equation:

$$e^{-\lambda \delta}(1 + \lambda \delta) = 1 - \lambda k_1$$

2. If $\lambda \geq 1/k_1$, then the LM-adaptive dominant strategy for the attacker is not playing at all.

Choosing the Defender's Rate of Play.

It was shown above that by playing exponentially, the defender induces a periodic play (or no play at all) for the attacker's dominant strategy. We now determine the rate $\lambda$ at which the defender should play to maximize its own benefit.

An LM-adaptive attacker can estimate the rate of play of the defender since it has information about the exact times of the defender's moves. Then, we can assume that a rational attacker always chooses the period $\delta$ of the dominant periodic strategy, as discussed above, a function of $\lambda$ and the move costs $k_0$ and $k_1$. A rate $\lambda$ chosen by the defender therefore induces a period $\delta$ for the attacker, known to the defender as well. The defender can then choose the rate of play $\lambda$ that maximizes its own benefit $\beta_0(E_\lambda, P_{1/\delta})$. A formula for determining the rate $\lambda$ that maximizes the defender's benefit in a game in which both players are rational can be obtained as follows. Assume that player's move costs are $k_0$ and $k_1$, the defender plays exponentially at rate $\lambda$, and an LM-adaptive attacker chooses period $\delta$ in the manner described previously. Then:

1. If $k_0 \geq 0.854 \cdot k_1$, the maximum benefit $\beta_0(E_\lambda, P_{1/\delta})$ is greater than $1-k_0/k_1$ and is achieved by playing at rate:

$$\lambda = \frac{1-(1+z)e^{-z}}{k_1},$$

where z is the unique solution of equation $$\frac{k_0}{k_1} = \frac{e^z - 1 - z}{z^3}.$$

For this choice of $\lambda$, the attacker's maximum benefit is achieved for period $$\delta = \frac{z}{\lambda}.$$

2. If $k_0 < 0.854 \cdot k_1$, the benefit $\beta_0(E_\lambda, P_{1/\delta})$ has maximum value $1-k_0/k_1$ and is achieved by playing at rate $\lambda = 1/k_1$. The attacker's best response is not playing at all, and thus $\beta_1(E_\lambda, P_{1/\delta}) = 0$.

The results given above for a powerful LM-adaptive adversary also hold for an RP adversary playing against an exponential defender (since the feedback received by an LM adversary is not helpful in improving its strategy). Certain of the results (those that do not require that the adversary knows the rate of play of the defender) hold for a NA or KS adversary as well. Thus, if the defender plays exponentially with a fixed rate, the dominant strategy for an NA, RP, KS or LM-adaptive adversary is periodic play. For an RP or LM adversary, the period $\delta$ of the dominant attacker strategy is as given above, and the defender maximizes its benefit by choosing its rate of play in the manner described above.

5.4 Defender Playing with Delayed Exponential Distribution

We now consider if the exponential distribution is the dominant renewal strategy for the defender playing against an LM-adaptive attacker. We provide experimental evidence that the defender's benefit achieved when playing exponentially can be further improved using a delayed exponential distribution. When playing with a delayed exponential distribution, the defender's inter-move times $X_n$ are computed as $X_n = \Delta + X_n'$, for $n \geq 0$ where $\Delta$ is a fixed "wait" time interval and $\{X_n'\}_{n \geq 0}$ are iid from an exponential distribution of rate $\lambda'$.

Intuitively, for some parameter choices in this game both players' benefits increase (or stay the same) compared to an exponential defender and periodic attacker game (analyzed in the previous section). The reason is that the fixed delay $\Delta$ induces moves from the defender with less frequency than in the exponential case. Also, if the attacker moves at time $t < \Delta$ after a defender move, it will wait for $\Delta - t$ before moving next (as it knows for sure the defender is not moving in a $\Delta$-long interval). As such, both players play less frequently and pay less for move costs, resulting in higher benefits for both.

We first show below the dominant LM-adaptive strategy for the attacker when the defender plays with a delayed exponential distribution. In the next subsection we provide experimental results that confirm that the defender's benefit increases by playing the delayed exponential strategy compared to simply playing exponentially. The question of which renewal strategy is dominant for the defender against an LM-adaptive adversary is left open.

Assume that the defender plays with a delayed exponential distribution given by parameters $\Delta$ and $\lambda'$. There exists a period $\delta'$ such that the dominant LM-adaptive strategy for the attacker is given by inter-move times $\{Y_n\}_{n \geq 0}$ with:

$$Y_{n+1} = \begin{cases} \Delta - \tau_n + \delta', & \text{if } \tau_n < \Delta \\ \delta', & \text{if } \tau_n \geq \Delta \end{cases}$$

5.5 Experimental Evaluation of Different Defender Strategies

We conclude this section by giving results of experimental evaluations of several defender strategies against adversaries receiving different types of feedback during the game. In FIG. 10, we plot the maximum defender's benefit against an LM-adaptive adversary. For the periodic and exponential renewal strategies, we plot the maximum benefit rates derived by our theoretical analysis above. Since we found it challenging to compute exact benefit rates for the defender playing with a delayed exponential distribution, we present experimental results for this distribution.

We have implemented the FlipIt game in Python with time discretized at integer intervals of length one. Each round of the game is played for 100,000 time units. To compute the benefit for fixed attacker and defender strategies, we run 10 instances of the game and report the average benefit rates. For the results presented in FIG. 10, we have fixed the defender's move cost $k_0$ at 5, and varied $k_1$ to achieve a particular ratio $k_1/k_0$ shown on the horizontal axis (the exception is the point with $k_1/k_0 = 0.5$, for which we used $k_0 = 10$ and $k_1 = 5$).

The delayed exponential distribution employed by the defender in this embodiment is completely characterized by two parameters: the wait interval $\Delta$ and the rate of play $\lambda'$. We exhaustively search the optimal parameters in the following space: $\Delta \in [0,50]$ and $\lambda' \in [0.01, 0.2]$ (discretized at a step of 0.01). We determined the search space for the rate of play by looking at the optimal rate for the exponential distribution and varying it within at least a factor of two both above and below. As for the wait interval, we noticed that in virtually all cases, waiting for longer than 50 time units results in very low benefit for the defender. For fixed parameters $\Delta$ and $\lambda'$, we experimentally search for the above-described dominant adversarial strategy against a delayed exponential distribution, which does not specify the exact value of parameter $\delta'$. We then exhaustively search for $\delta'$ in a sufficiently large interval (at least 8-10 larger than the move cost $k_1$).

It is apparent from the figure that the periodic strategy is a poor choice for an LM-adaptive adversary, as the defender's benefit is 0. Also, the delayed exponential strategy outperforms the exponential strategy, for cases in which $k_1/k_0 > 1$. Besides, a very counterintuitive observation is that it is sometimes in a player's best interest to release information about its own strategy. In this example, if the adversary knows that the defender plays with an exponential distribution, the adversary chooses a different rate of play than in a renewal game in which the adversary has no additional information about the defender's strategy. This additional knowledge released to the adversary results in increased defender benefit (for particular choices of move costs).

The benefit achieved by playing a delayed exponential distribution against an KS+RP adversary is not plotted.

However, it is expected that if the adversary only knows the rate of play and the defender's distribution, but receives no additional feedback during the game, he cannot do better than playing with a periodic strategy (as he cannot predict the exact move times of the defender).

As noted above, the delayed exponential distribution outperforms the exponential strategy for carefully chosen parameters (the increase in the defender's benefit ranges between 15% and 140%). For a more thorough comparison, we present in Table 1 below the exact parameters and benefits achieved for both the exponential and delayed exponential strategies. We observe that the optimal wait intervals Δ increase with the attacker's move cost $k_1$, and that the optimal rate λ' is always higher than the optimal rate λ of the exponential strategy.

TABLE 1

Parameters and benefits for optimal exponential and delayed exponential strategies

| | Exponential | | | Delayed exponential | | | |
|---|---|---|---|---|---|---|---|
| $k_1/k_0$ | λ | $\beta_0$ | $\beta_1$ | Δ | λ' | $\beta_0$ | $\beta_1$ |
| 0.5 | 0.0062 | 0.062 | 0.76 | 11 | 0.007 | 0.082 | 0.75 |
| 1 | 0.0258 | 0.1262 | 0.5368 | 4 | 0.045 | 0.1558 | 0.4188 |
| 1.25 | 0.16 | 0.2 | 0 | 4 | 0.18 | 0.475 | 0 |
| 1.5 | 0.13 | 0.33 | 0 | 8 | 0.18 | 0.6324 | 0 |
| 2 | 0.1 | 0.5 | 0 | 12 | 0.17 | 0.7203 | 0 |
| 2.5 | 0.08 | 0.6 | 0 | 14 | 0.12 | 0.776 | 0 |
| 3 | 0.066 | 0.66 | 0 | 18 | 0.12 | 0.8113 | 0 |
| 3.5 | 0.057 | 0.72 | 0 | 20 | 0.09 | 0.839 | 0 |
| 4 | 0.05 | 0.75 | 0 | 24 | 0.09 | 0.858 | 0 |

Table 1: Parameters and benefits for optimal exponential and delayed exponential strategies Also, in an instance of FlipIt with an LM-adaptive adversary, it is expected that the defender receiving feedback during the game and playing with an adaptive strategy can strictly improve its benefit compared to playing non-adaptively.

As indicated previously, the delayed exponential distribution referred to above is an example of what is more generally referred to herein as a "modified exponential distribution," and is implemented as a combination of an exponential distribution and a periodic distribution. In other embodiments of the present invention, other types of modified exponential distributions may be used, such as, for example, an exponential distribution combined with at least one other distribution of a different type, such as a gamma distribution, a normal distribution or a uniform distribution. More generally, other embodiments may utilize other types of distributions that are not modified exponential distributions, such as a gamma distribution.

6 the Greedy Algorithm for an LM-Adaptive Attacker

We propose and analyze now a Greedy algorithm for an LM-adaptive attacker playing against a non-adaptive defender employing a known renewal strategy. We show that the strategy given by the Greedy algorithm is dominant for some fixed distributions defining the defender's strategy (in particular for the exponential and periodic distributions). We also give an example of a renewal strategy for which the Greedy algorithm doesn't result in a dominant strategy for the attacker.

6.1 Algorithm Definition

At the high level, the Greedy algorithm optimizes the local benefit the attacker achieves between two consecutive moves. Assume that the defender employs a renewal strategy given by probability density function $f_0$ and cumulative distribution function $F_0$. The LM-adaptive attacker receives information upon moving (at time t) about the time τ passed since the defender's last move. The Greedy algorithm with inputs $f_0$ and τ outputs a time interval $\hat{z}$ until the attacker's next move that maximizes the local benefit achieved in interval $[t, t+\hat{z}]$.

In more detail, the first step of the Greedy algorithm is to estimate the probability density $\hat{f}_0$ of the time till the defender's next move. Assume that the next attacker's move after time t is at time t+z. If the defender's next move after time t is at time t+x (this happens with probability $\hat{f}_0(x)$) and t+x<t+z, then the attacker controls the resource a fraction x/z in interval [t,t+z]. On the other hand, if the defender's next move after time t is at time t+x>t+z, then the attacker controls the resource the entire interval [t,t+z]. The local benefit L(z) in interval [t,t+z] can then be computed based on these two cases. The interval $\hat{z}$ until the next attacker's move is the point that maximizes the local benefit L(z).

The Greedy algorithm proceeds as follows:
1. Compute $\hat{f}_0(x)$ defined as the probability density of the time till defender's next move:

$$\hat{f}_0(x) = \frac{f_0(\tau + x)}{1 - F_0(\tau)}$$

2. Define the local benefit:

$$L(z) = 1/z [\int_{x=0}^z x \hat{f}_0(x) dx + z \int_z^\infty \hat{f}_0(x) dx - k_1].$$

3. Compute $\hat{z}$ that maximizes the local benefit L(z).
4. If $L(\hat{z}) \geq 0$, move after $\hat{z}$ time units; otherwise do not move.

We analyze now the Greedy algorithm for several defender strategies including exponential, uniform and periodic renewal distributions. Our goal is to determine the attacker strategies given by the Greedy algorithm and compare them with the dominant ones (in the case of periodic and exponential defender strategies, the dominant LM adversarial strategies are as given in the previous section).

6.2 Defender Playing Exponentially Against Greedy

Assume that $f_0$ is an exponential distribution of rate λ: $f_0(x) = \lambda e^{-\lambda x}, x > 0$. In this case $$\hat{f}_0(x) = \frac{\lambda e^{-\lambda(x+\tau)}}{e^{-\lambda \tau}} = \lambda e^{-\lambda x} = f_0(x).$$

Then L(z) does not depend on the time since the defender's last move τ, and as such the optimum $\hat{z}$ is always the same when the Greedy algorithm is invoked (after each attacker's move). The exception is the first attacker move for which the attacker does not have information about the defender's previous move. With the assumption that the attacker picks the first move uniformly at random, the strategy given by the Greedy algorithm is periodic with random phase.

We can now compute L(z):

$$L(z) = \frac{1}{z} \int_0^z x \lambda e^{-\lambda x} dx + \int_z^\infty \lambda e^{-\lambda x} dx - \frac{k_1}{z} = \frac{1 - e^{\lambda z}}{\lambda z} - e^{-\lambda z} + e^{-\lambda z} - \frac{k_1}{z} = \beta_1(E_\lambda, P_z)$$

We observe that L(z) is equal to the attacker's benefit obtained in game FlipIt($E_\lambda, P_z$). Therefore, the point $\hat{z}$ that optimizes L(z) in step 3 of the Greedy algorithm is the period δ of the dominant periodic strategy given previously. We have thus showed that the Greedy algorithm finds the dominant LM-adaptive strategy against an exponential defender.

6.3 Defender Playing Periodically Against Greedy

Assume that the defender plays with the periodic strategy with random phase $P_\alpha$ given by period $\delta = 1/\alpha$. The attacker is LM-adaptive and its move cost is $k$, $< \delta/2$.

Assume that the first move of the attacker is at time $t = \delta$, and the interval since the defender's last move is $\tau$. Since the defender plays with a periodic strategy, the next defender's move is scheduled at time $t+(\delta \tau \tau)$. To compute the local benefit L(z) in interval $[t, t+z]$, we consider two cases:

Case 1: $z \geq \delta - \tau$

The attacker controls the resource for time $\delta - \tau$ (until the defender's next move) in interval $[t, t+z]$. Therefore, benefit L(z) can be written as:

$$L(z) = \frac{\delta - \tau - k_1}{z}$$

Case 2: $z < \delta - \tau$

The attacker controls the resource the entire interval $[t, t+z]$ since the defender does not move in this interval. We can, hence, express L(z) as:

$$L(z) = \frac{z - k_1}{z} = 1 - \frac{k_1}{z}$$

The local benefit L(z) is strictly increasing on interval $[0, \delta - \tau]$. However, on the interval $[\delta - \tau, \infty]$, L(z) could be either strictly increasing or strictly decreasing depending on whether $\tau > \delta - k_1$ or $\tau < \delta - k_1$. Since $\tau$ is uniformly distributed in interval $[0, \delta]$, the probability that L(z) is strictly increasing on $[\delta - \tau, \infty]$ is 1/2. Hence, with probability 1/2 the optimum point $\hat{z}$ in step 3 of the Greedy algorithm is $\infty$, and the attacker will stop playing after the first move.

However, with probability 1/2, L(z) is strictly decreasing on $[\delta - \tau, \infty]$, and, therefore the maximum L(z) is achieved at point $\hat{z} = \delta - \tau$. The Greedy strategy in this case results in the dominant strategy given in Section 5.2 (but only with probability 1/2).

We can reduce the probability that Greedy stops playing to $$\frac{1}{2^n}$$

by repeating the game n times. Therefore, Greedy results in the dominant strategy with sufficiently high probability $$\left(1 - \frac{1}{2^n}\right)$$

after n games.

6.4 Defender Playing by the Uniform Distribution Against Greedy

We analyze now the Greedy algorithm against an uniform defender distribution $f_0$ centered at $\delta$ and of support u, denoted $U[\delta, u]$. We assume that $3u/2 < \delta$. The density and cumulative probability functions of the uniform distribution are:

$$f_0(x) = \begin{cases} \frac{1}{u}, & \delta - \frac{u}{2} \leq x \leq \delta + \frac{u}{2} \\ 0, & \text{otherwise} \end{cases} \quad F_0(x) = \begin{cases} 0, & x < \delta - \frac{u}{2} \\ \frac{x - \left(\delta - \frac{u}{2}\right)}{u}, & \delta - \frac{u}{2} \leq x \leq \delta + \frac{u}{2} \\ 1, & x < \delta + \frac{u}{2} \end{cases}$$

When the attacker moves at time t, he learns the time $\tau$ since the defender's last move and the Greedy algorithm is invoked to compute the time $\hat{z}$ until its next move. A formula for $\hat{z}$ depending on the parameters of the uniform defender distribution, time since last defender's move and the attacker's move cost can be developed as follows. Assume the defender plays with a renewal strategy given by probability density function $f_0$, and the attacker finds out when attacker's move cost is $k_1 < \delta - u$. Then the time until the next attacker's move given by the Greedy algorithm is $$\hat{z} = \sqrt{(\delta - u/2 - \tau)^2 + 2k_1/c},$$

where c is a constant defined as:

$$c = \begin{cases} \frac{1}{u} & \tau \leq u \\ \frac{1}{\delta + u/2 - \tau}, & \tau \geq \delta - u/2 \end{cases}$$

In addition the time since the defender's last move is always either less than u or greater than $\delta - u/2$.

The uniform distribution is an example of a renewal defender strategy for which we cannot easily find the dominant LM-adaptive strategy. Nevertheless, we can use the formula above to determine the strategy given by the Greedy algorithm. Other algorithms can be used to find the dominant LM-adaptive strategy against a renewal defender.

6.5 Greedy does not Always Result in Dominant Strategies

The analysis in Subsection 6.3 showed that for a periodic defender, there is a certain probability that the Greedy algorithm will stop playing after the first move, but this probability can be made arbitrarily small. Nevertheless, with high probability, the Greedy algorithm finds the dominant LM-adaptive strategy. We give now an example of a renewal strategy for which Greedy outputs a non-dominant strategy (with high probability).

Consider the defender renewal strategy given by density function $f_0$ defined as:

$$f_0(x) = \begin{cases} 1, & \text{with probability } 0.01 \\ 1000, & \text{with probability } 0.99 \end{cases}$$

Assume that the move costs for both players are $k_0 = k_1 = 5$. We first compute the strategy given by the Greedy algorithm, and then define another strategy that achieves higher benefit.

Consider the following proposition. If the attacker moves at time t, and receives feedback $0<\tau<1000-k_1$, then the Greedy algorithm outputs $\hat{z}=1000-\tau$. This can be shown using a number of cases as indicated below.

Case 1: $0<\tau<1$

We can compute $L(z)$ as:

$$L(z) = \begin{cases} \dfrac{z-k_1}{z}, & \tau+z \leq 1 \\ \dfrac{0.01(1-\tau)+0.99z-k_1}{z}, & 1 < \tau+z < 1000 \end{cases}$$

For $\tau+z<1$, $L(z)$ is negative. For $1<\tau+z<1000$, $L(z)$ is strictly increasing, and hence the maximum is $\hat{z}=1000-\tau$.

Case 2: $1 \leq \tau < 1000$

We can compute $L(z)$ as:

$$L(z) = \begin{cases} \dfrac{z-k_1}{z} = 1 - \dfrac{k_1}{z}, & z \leq 1000-\tau \\ \dfrac{1000-\tau-k_1}{z}, & z \geq 1000-\tau \end{cases}$$

Therefore $L(z)$ is strictly increasing when $z \leq 2000-\tau$, and strictly decreasing when $z \geq 1000-\tau$. The maximum is achieved at $\hat{z}=1000-\tau$.

We define now a strategy that achieves higher benefit than the Greedy strategy. At time t, assume that the adversary moves and receives feedback $\tau$. With this strategy, the adversary always moves after time 1, if $\tau<1$. On the other hand, if $1<\tau<1000$, then the adversary moves after time $1000-\tau$.

Let $\beta_1 = \gamma_1 - k_1\alpha_1$ be the benefit of the adversary in the above strategy. Also, denote by $\beta_1^g = \gamma_1^g - k_1\alpha_1^g$ the benefit achieved by playing with the Greedy strategy defined previously. With the newly defined strategy, the attacker moves right after all defender's moves, virtually controlling the resource at all times. Compared to the Greedy strategy, the adversary controls the resource an additional 0.01 fraction of time, resulting in $\gamma_1 - \gamma_1^g \geq 0.01$. The increase in move cost for this strategy is at most $0.01k_1\alpha_0$.

We can infer that:

$$\beta_1 - \beta_1^g \geq 0.01 - 0.01k_1\alpha_0 = 0.01\left[1 - \dfrac{5}{990.01}\right] > 0$$

Therefore the benefit of the adversary is increased compared to the Greedy strategy, demonstrating that the Greedy strategy does not result in the dominant attacker strategy against this example renewal defender distribution.

7 General Variations and Extensions

We have defined and analyzed a basic version of the FlipIt game. The motivating applications we discussed in Section 2 raise a number of extensions and variations of likely interest in practical settings.

Other Types of Feedback.

In Section 3 we defined three different types of feedback in FlipIt: NA, RP and LM. The illustrative embodiments analyzed above relate primarily to one of these three versions of the game. We could define different FlipIt instances in which players receive other types of feedback during the game, for example:

Previous Mover [PM].

The player who moves at time $t_k>0$ learns the identity of the most recent previous mover, that is, player $p_k$ learns the value $$\phi_i(t_k) = X(t_k) = p_{k-1}.$$

For $k>1$, if $p_k \neq p_{k-1}$, then move k at time $t_k$ is a takeover or a turnover, control of the game changes hands from player $p_{k-1}$ to player $p_k$.

Score [SC].

The mover finds out the score of both players. Note that this information is sufficient to figure out when your opponent regained control after your last move, if he had done so.

$$\phi_i(t_k) = (B_0(t_k), B_1(t_k))$$

where $B_i(t_k)$ is the score of player i up to time $t_k$.

Cost Variations.

Our FlipIt models above assume that the move cost $k_i$ time t is constant for each player. In variants of this game, $k_i$ may depend on other factors, such as $X(t)$ and $s(t)$ (who has possession of the resource at time t, and for how long they have had possession). Recall that one such variant arose in the cloud service audit scenario: We considered the possibility of $k_1$ (provider cost) depending on the current number $n_0(t)$ of defender takeovers.

Other extensions may utilize a "discount rate" for benefits and costs, e.g., a move cost $k_i$ at time $t-d$ is only $\rho^d$ of that at time t, for some $\rho<1$.

Budgets.

One or both players have a move budget they can't exceed. For instance, a tenant's security operations may have an operating budget capping the number of audits over the course of a year. Alternatively, upper bounds might be imposed on the players' respective move rates.

Effective/Ineffective Moves.

In reality, moves don't always succeed. In the cloud service audit scenario, for instance, many proposed audit protocols only detect an SLA compliance failure by a cloud provider with some probability $q<1$.

We may therefore consider a model in which only with some probability $q<1$ is a move effective, in the sense that it gives control to the player that has made it (if she doesn't already have control). A move is ineffective, then, i.e., doesn't effect a change of control, with probability $1-q$.

Paying for More Information.

The players in FlipIt might pay for more information. That is, a basic "move" would cost $k_i$, but to find out the previous mover would cost an additional amount. Password reset offers an example application of this variant. Some systems display to users the time of last login to their accounts, information that can reveal to an attentive user the compromise and use of his or her account by an attacker. Getting users to pay attention to this extra information, though, carries a cost. It might involve, for instance, a pop-up window displaying the account's login history and requiring verification by the user, a valuable but burdensome security feature.

Extra discovery options might have tiered pricing. To find out the current score would cost even more than the current state of control. To find out the complete history would cost more yet.

Other Variants.

Of course, numerous other variants or extensions of FlipIt have practical application. Some examples are as follows:

Finite-time games: Our experiments, as explained above, are simulations (in a discrete-time model) with a bounded time horizon T. Such games are of interest given the finite lifetime of most system deployments, and may be combined with other variant games features (e.g., bounded player budgets). For small T, optimal strategies can be exactly computed.

Refractory periods: In this variant, a player that has moved at time t isn't allowed to move again until at least time t+$\rho$. Here, $\rho$ is what we call "refractory period," a time delay that reflects the resource depletion caused by a move (in, e.g., financial budget, personnel time, etc.). Note that in the basic (continuous) form of the game with $k_0=k_1=1$, a refractory period of $\rho=1$ is implicit: Since the move cost equals the benefit of control for an interval of length 1, it's always suboptimal to move twice in one such interval.

Multiplayer games: Straightforward extensions of FlipIt can model competition for resource control among three or more players.

The above-described illustrative embodiments allow optimal scheduling of defensive security actions in system 100 and a wide variety of other types of information processing systems.

For example, the techniques presented herein demonstrate that systems should be designed under the assumption of repeated total compromise, including theft of cryptographic keys. Many times, attackers cross the line cryptographers have assumed in designing their protocols. This view has already been expressed by the head of the NSA's Information Assurance Directorate: "No computer network can be considered completely and utterly impenetrable—not even that of the NSA. NSA works under the assumption that various parts of their systems have already been compromised, and is adjusting its actions accordingly".

The FlipIt games described herein provide guidance on how and when to implement a cost-effective defense. For instance, based on the type of game-theoretic analysis provided above, defenders can determine when they should change cryptographic keys or user credentials, and how often they should clean their machines, or refresh virtual machine instances.

Also, aggressive play by the defender can motivate the attacker to drop out of the game (essentially not to play at all). The best defensive strategy, therefore, is to play fast (for instance by changing passwords frequently, rebooting servers often or refreshing machines regularly) and make the opponent drop out of the game. To be able to move fast, the defender should arrange the game so that its moves cost much less than the attacker's moves. Accordingly, the system infrastructure should be configured such that refresh/clean costs are very low.

As we have shown in our theoretical analysis, any amount of feedback (even limited) received during the game about the opponent benefits a player in Flipit. Defenders, therefore, should monitor their systems frequently to gain information about the attacker's strategy and detect potential attacks quickly after takeover. Both monitoring and fast detection help in more effectively scheduling defensive moves, which results in more control of the resource and reduction in the budget spent on moves, effectively increasing the defender's benefit.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, selected distributions, game-theoretic models, and persistent security threats. The particular process steps and component interactions used to implement defensive security action scheduling may be varied in alternative embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
    identifying a plurality of defensive security actions to be taken to address a persistent security threat; and
    determining a schedule for performance of the defensive security actions based at least in part on a selected distribution derived from a game-theoretic model;
    wherein a system comprising information technology infrastructure subject to the persistent security threat is configured to perform the defensive security actions in accordance with the schedule in order to deter the persistent security threat;
    wherein the selected distribution comprises a modified exponential distribution given by a combination of an exponential distribution and at least one other distribution; and
    wherein the steps are performed by a processing device comprising a processor coupled to a memory.

2. The method of claim 1 wherein performing the defensive security actions in accordance with the schedule comprises performing said actions sequentially with time intervals between said actions being specified by the schedule.

3. The method of claim 1 wherein the modified exponential distribution is determined based at least in part on assessment of the persistent security threat and the defensive security actions in accordance with the game-theoretic model.

4. The method of claim 1 wherein the distribution is selected to optimize defender benefit in the context of the game-theoretic model.

5. The method of claim 4 wherein the game-theoretic model comprises a stealthy takeover game in which attacker and defender entities can take actions at any time, with the actions having associated costs, but cannot determine current game state without taking an action.

6. The method of claim 1 further comprising the steps of:
    characterizing the persistent security threat and the defensive security actions in accordance with the game-theoretic model; and
    selecting one of a plurality of available distributions based at least in part on a result of the characterizing step.

7. The method of claim 1 wherein the modified exponential distribution comprises a delayed exponential distribution formed as a combination of an exponential distribution and a periodic distribution.

8. The method of claim 1 wherein the modified exponential distribution comprises an exponential distribution combined with at least one of a gamma distribution, a normal distribution and a uniform distribution.

9. The method of claim 1 wherein the defensive security actions comprise respective key update operations.

10. The method of claim 1 wherein the defensive security actions comprise respective virtual machine refresh operations.

11. The method of claim 1 wherein the defensive security actions comprise respective cloud service auditing operations.

12. The method of claim 1 wherein the defensive security actions comprise respective password reset operations.

13. The method of claim 1 wherein the defensive security actions are determined in accordance with an adaptive defensive strategy that takes into account feedback associated with one or more previous actions.

14. The method of claim 1 wherein the processing device is implemented within the information technology infrastructure of the system.

15. The method of claim 1 wherein the selected distribution comprises a gamma distribution.

16. A computer program product comprising a non-transitory processor-readable storage medium having encoded therein executable code of one or more software programs, wherein the one or more software programs when executed by a processing device cause the processing device:
   to identify a plurality of defensive security actions to be taken to address a persistent security threat; and
   to determine a schedule for performance of the defensive security actions based at least in part on a selected distribution derived from a game-theoretic model;
   wherein a system comprising information technology infrastructure subject to the persistent security threat is configured to perform the defensive security actions in accordance with the schedule in order to deter the persistent security threat; and
   wherein the selected distribution comprises a modified exponential distribution given by a combination of an exponential distribution and at least one other distribution.

17. The computer program product of claim 16 wherein the modified exponential distribution comprises at least one of:
   a delayed exponential distribution formed as a combination of an exponential distribution and a periodic distribution; and
   an exponential distribution combined with at least one of a gamma distribution, a normal distribution and a uniform distribution.

18. An apparatus comprising:
   at least one processing device comprising a processor coupled to a memory;
   wherein the memory is configured to store information characterizing a plurality of defensive security actions to be taken to address a persistent security threat;
   wherein the processing device under control of the processor is operative to determine a schedule for performance of the defensive security actions based at least in part on a selected distribution derived from a game-theoretic model;
   wherein the selected distribution comprises a modified exponential distribution given by a combination of an exponential distribution and at least one other distribution; and
   wherein a system comprising information technology infrastructure subject to the persistent security threat is configured to perform the defensive security actions in accordance with the schedule in order to deter the persistent security threat.

19. The apparatus of claim 18 wherein the processing device is implemented within the information technology infrastructure of the system.

20. The apparatus of claim 18 wherein the information technology infrastructure comprises distributed virtual infrastructure of a cloud service provider.

21. An information processing system comprising:
   information technology infrastructure subject to a persistent security threat; and
   at least one processing device;
   wherein the processing device is configured to identify a plurality of defensive security actions to be taken to address a persistent security threat, and to determine a schedule for performance of the defensive security actions based at least in part on a selected distribution derived from a game-theoretic model;
   wherein the selected distribution comprises a modified exponential distribution given by a combination of an exponential distribution and at least one other distribution; and
   wherein the information technology infrastructure is configured to perform the defensive security actions in accordance with the schedule in order to deter the persistent security threat.

22. The information processing system of claim 21 wherein the information technology infrastructure comprises at least one processing platform comprising a plurality of processing devices with each such processing device of the processing platform comprising a processor coupled to a memory.

* * * * *